US009585150B2

(12) United States Patent  
Marsh et al.

(10) Patent No.: US 9,585,150 B2  
(45) Date of Patent: Feb. 28, 2017

(54) EPFD COVERAGE FOR NGSO SATELLITES

(71) Applicant: QUALCOMM Incorporated, San Diego, CA (US)

(72) Inventors: Gene Wesley Marsh, Encinitas, CA (US); Qiang Wu, San Diego, CA (US); Peter John Black, San Diego, CA (US); Dan Vassilovski, Del Mar, CA (US); Mehmet Izzet Gurelli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/864,791

(22) Filed: Sep. 24, 2015

(65) Prior Publication Data

US 2016/0278064 A1    Sep. 22, 2016

Related U.S. Application Data

(60) Provisional application No. 62/136,075, filed on Mar. 20, 2015.

(51) Int. Cl.
*H04H 20/71* (2008.01)
*H04W 72/04* (2009.01)
(Continued)

(52) U.S. Cl.
CPC .......... *H04W 72/046* (2013.01); *H04B 7/185* (2013.01); *H04B 7/18513* (2013.01);
(Continued)

(58) Field of Classification Search
CPC ............. H04W 72/046; H04W 52/243; H04W 72/0473; H04B 7/185; H04B 7/18513; H04B 7/18539; H04B 7/2041; H04B 7/18543
(Continued)

(56) References Cited

U.S. PATENT DOCUMENTS 5,625,868 A    4/1997   Jan et al.
6,011,951 A    1/2000   King et al.
(Continued)

FOREIGN PATENT DOCUMENTS

EP    0944183 A1    9/1999
EP    1223691 A2    7/2002
(Continued)

OTHER PUBLICATIONS

International Search Report and Written Opinion—PCT/US2016/021083—ISA/EPO—Jun. 1, 2016.
(Continued)

*Primary Examiner* — Shaima Q Aminzay
(74) *Attorney, Agent, or Firm* — Paradice and Li LLP

(57) ABSTRACT

A method and apparatus for operating one or more satellites in a non-geosynchronous orbit (NGSO) satellite constellation are disclosed. In some aspects, a coverage area on Earth for a first beam transmitted from a first satellite in the NGSO satellite constellation may be determined, a cone may be projected onto a first region of the beam coverage area, a second region of the beam coverage area may be defined as including portions of the beam coverage area lying outside the first region, and a minimum arc angle for each of a plurality of points within the first region but not the second region of the beam coverage area may be determined.

29 Claims, 16 Drawing Sheets

(51) Int. Cl.
 *H04W 52/24* (2009.01)
 *H04B 7/185* (2006.01)
 *H04B 7/204* (2006.01)

(52) U.S. Cl.
 CPC ....... *H04B 7/18539* (2013.01); *H04B 7/2041* (2013.01); *H04W 52/243* (2013.01)

(58) Field of Classification Search
 USPC ... 455/3.02, 1, 3.3, 3.01, 9, 12.1, 12.3, 13.4, 455/427, 414.1, 456.1; 244/158.4, 158.6
 See application file for complete search history.

(56) References Cited

U.S. PATENT DOCUMENTS

| | | | |
|---|---|---|---|
| 6,055,431 | A | 4/2000 | Dybdal |
| 6,236,834 | B1 | 5/2001 | Poskett et al. |
| 6,587,687 | B1 | 7/2003 | Wiedeman |
| 6,678,520 | B1 | 1/2004 | Wang |
| 6,775,251 | B1 | 8/2004 | Wiedeman et al. |
| 6,850,732 | B2 | 2/2005 | Patterson et al. |
| 6,866,231 | B2 | 3/2005 | Higgins |
| 7,554,937 | B2 | 6/2009 | Lim et al. |
| 7,627,284 | B2 | 12/2009 | Wang |
| 7,706,787 | B2 | 4/2010 | Malarky et al. |
| 7,840,180 | B2 | 11/2010 | Rosen |
| 7,995,989 | B2 | 8/2011 | Wiedeman et al. |
| 8,897,769 | B2 | 11/2014 | Miller et al. |
| 2001/0045494 | A1* | 11/2001 | Higgins ............... B64G 1/1007 244/158.4 |
| 2003/0081573 | A1 | 5/2003 | Anderson et al. |
| 2004/0092257 | A1 | 5/2004 | Chung et al. |
| 2004/0110467 | A1 | 6/2004 | Wang |
| 2007/0117509 | A1 | 5/2007 | Wang |
| 2008/0242339 | A1 | 10/2008 | Anderson |
| 2013/0069820 | A1 | 3/2013 | Wyler |
| 2014/0177521 | A1 | 6/2014 | Agarwal |
| 2015/0158602 | A1 | 6/2015 | Marshack et al. |

FOREIGN PATENT DOCUMENTS

| | | |
|---|---|---|
| WO | WO-00/41340 A1 | 7/2000 |
| WO | WO-02053455 A1 | 7/2002 |

OTHER PUBLICATIONS

Marsh, G. et al., "Dynamic Frequency Allocation of Satellite Beams", Co-pending U.S. Appl. No. 14/864,722, filed Sep. 24, 2015.

Zhang, D. et al., "Satellite Beam Power Backoff", Co-Pending U.S. Appl. No. 14/864,758, filed Sep. 24, 2015.

ITU-R S.1503-2, "Functional description to be used in developing software tools for determining conformity of non-geostationary-satellite orbit fixed-satellite system networks with limits contained in Article 22 of the Radio Regulations", Fixed Satellite service, Dec. 2013, pp. 1-115, specifically pp. 20-29, 55, and 85-89.

\* cited by examiner

EPFD COVERAGE FOR NGSO SATELLITES

CROSS-REFERENCE TO RELATED APPLICATIONS

This application claims priority under 35 USC 119(e) to co-pending and commonly owned U.S. Provisional Patent Application No. 62/136,075 entitled "IMPROVING EPFD COVERAGE FOR NGSO SATELLITES" filed on Mar. 20, 2015, the entirety of which is incorporated by reference herein.

INTRODUCTION

Various aspects described herein relate to satellite communications, and more particularly to complying with international regulations governing satellite communications.

Conventional satellite-based communication systems include gateways and one or more satellites to relay communication signals between the gateways and one or more user terminals. A gateway is an Earth station having an antenna for transmitting signals to, and receiving signals from, communication satellites. A gateway provides communication links, using satellites, for connecting a user terminal to other user terminals or users of other communication systems, such as a public switched telephone network, the internet and various public and/or private networks. A satellite is an orbiting receiver and repeater used to relay information.

A satellite can receive signals from and transmit signals to a user terminal provided the user terminal is within the "footprint" of the satellite. The footprint of a satellite is the geographic region on the surface of the Earth within the range of signals of the satellite. The footprint is usually geographically divided into "beams," through the use of one or more antennas. Each beam covers a particular geographic region within the footprint. Beams may be directed so that more than one beam from the same satellite covers the same specific geographic region.

Geosynchronous satellites have long been used for communications. A geosynchronous satellite is stationary relative to a given location on the Earth, and thus there is little timing shift and frequency shift in radio signal propagation between a communication transceiver on the Earth and the geosynchronous satellite. However, because geosynchronous satellites are limited to a geosynchronous orbit (GSO), the number of satellites that may be placed in the GSO is limited. As alternatives to geosynchronous satellites, communication systems which utilize a constellation of satellites in non-geosynchronous orbits (NGSO), such as low-earth orbits (LEO), have been devised to provide communication coverage to the entire Earth or at least large parts of the Earth.

GSO and NGSO satellites may operate on the same (or similar) frequency bands, and therefore interference mitigation techniques may be employed by NGSO satellites so that GSO satellite communications are not impaired by NGSO satellite transmissions. For example, the International Telecommunication Union (ITU) provides limits on the equivalent power flux-density (EPFD) that an NGSO satellite may produce at any point on the Earth's surface lying within the footprint of a GSO satellite.

Because calculating the EPFD at a given point on the Earth's surface may require extensive knowledge of the antenna and/or transmissions characteristics of various ground stations, NGSO satellites typically use other techniques to meet the ITU's EPFD limits. One method of meeting the EPFD limits is for an NGSO satellite to disable its beam if, at any point in the beam's coverage area on Earth, the angle between the NGSO satellite and the GSO satellite is less than a threshold angle (e.g., which may indicate that the GSO satellite's beam termination point on Earth lies within the coverage area of the NGSO satellite's beam). Although disabling the beam of an NGSO satellite in this manner may allow the NGSO satellite to meet the EPFD limits, this may result in unnecessary coverage gaps for the NGSO satellite communication system (e.g., when only a portion of the NGSO satellite's beam interferes with the GSO satellite's transmissions).

SUMMARY

Aspects of the disclosure are directed to apparatuses and methods for minimizing (or eliminating) satellite service gaps resulting from efforts to comply with the ITU's EPFD limits and/or to avoid interfering with GSO satellite communications. In one example, a method for operating one or more satellites in a non-geosynchronous orbit (NGSO) satellite constellation is disclosed. The method may include determining a coverage area on Earth for a first beam transmitted from a first satellite in the NGSO satellite constellation, projecting a cone onto a first region of the beam coverage area, defining a second region of the beam coverage area as including portions of the beam coverage area lying outside the first region, and determining a minimum arc angle for each of a plurality of points within the first region but not the second region of the beam coverage area.

In another example, an apparatus for operating one or more satellites in an NGSO satellite constellation is disclosed. The apparatus may include means for determining a coverage area on Earth for a first beam transmitted from a first satellite in the NGSO satellite constellation, means for projecting a cone onto a first region of the beam coverage area, means for defining a second region of the beam coverage area as including portions of the beam coverage area lying outside the first region, and means for determining a minimum arc angle for each of a plurality of points within the first region but not the second region of the beam coverage area.

In another example, an apparatus for operating one or more satellites in an NGSO satellite constellation is disclosed. The apparatus may include one or more processors and a memory configured to store instructions. Execution of the instructions by the one or more processors may cause the apparatus to determine a coverage area on Earth for a first beam transmitted from a first satellite in the NGSO satellite constellation, project a cone onto a first region of the beam coverage area, define a second region of the beam coverage area as including portions of the beam coverage area lying outside the first region, and determine a minimum arc angle for each of a plurality of points within the first region but not the second region of the beam coverage area.

In another example, a non-transitory computer-readable medium is disclosed. The non-transitory computer-readable medium may store instructions that, when executed by one or more processors of an apparatus, cause the apparatus to determine a coverage area on Earth for a first beam transmitted from a first satellite in the NGSO satellite constellation, project a cone onto a first region of the beam coverage area, define a second region of the beam coverage area as including portions of the beam coverage area lying outside the first region, and determine a minimum arc angle for each of a plurality of points within the first region but not the second region of the beam coverage area.

BRIEF DESCRIPTION OF THE DRAWINGS

Aspects of this disclosure are illustrated by way of example and are not intended to be limited by the figures of the accompanying drawings.

Like reference numerals refer to corresponding parts throughout the drawing figures.

DETAILED DESCRIPTION

Figure 1:
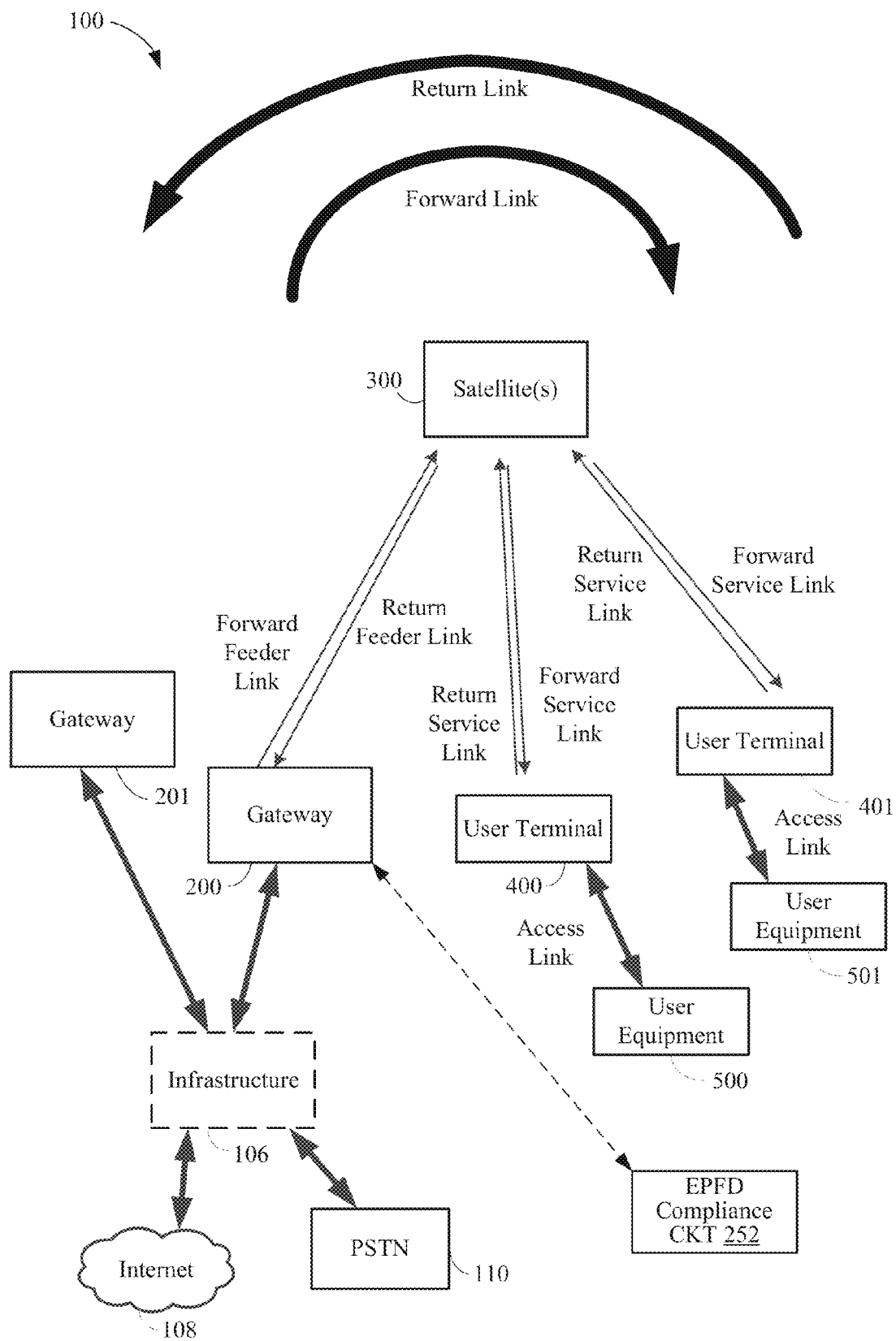
FIG. 1 shows a block diagram of an example communication system.

The example implementations described herein may allow a constellation of NGSO satellites to comply with the ITU's EPFD limits without disabling beams transmitted from the NGSO satellites based solely on, for example, exclusion zones defined by the ITU. As described in more detail below, one or more beams may be transmitted from one or more satellites that may form or be part of an NGSO satellite constellation. Each of the beams may be selected for examination to ensure that the beams comply with the EPFD limits and/or to avoid interfering with GSO satellite communications. For example, a first satellite may direct a number of beams to portions of the service area provided by the NGSO satellite constellation (e.g., wherein the number of beams may correspond to the first satellite's footprint). A controller associated with the first satellite may determine a coverage area on Earth for a first beam transmitted from the first satellite. A cone may be projected onto a first region of the beam coverage area. The controller may define a second region of the beam coverage area as including portions of the beam coverage area lying outside the first region. Then, the controller may determine a minimum arc angle for each of a plurality of points within the first region but not the second region of the beam coverage area.

For some implementations, the first region of the beam coverage area may be considered for potential violations of the EPFD limits, and the second region of the beam coverage area may not be considered for potential violations of the EPFD limits (e.g., because points within the second region may not interfere with GSO satellite communications). In some aspects, the first region of the beam coverage area may correspond to an area on the Earth's surface for which the first beam's antenna gain is within a threshold value of the first beam's maximum antenna gain. In other aspects, the first region of the beam coverage area may correspond to an area on the Earth's surface for which the power flux density (PFD) is greater than a threshold PFD level.

The controller may determine the minimum arc angle for each of a plurality of points within the first region but not the second region of the beam coverage area. For some implementations, the controller may select one of the plurality of points within the first region, compare the determined minimum arc angle for the selected point with a threshold angle, and then selectively disable the first beam based at least in part on the comparing. The controller may disable the first beam based on the determined minimum arc angle being less than the threshold angle, and may select another point of the plurality of points based on the determined minimum arc angle being not less than the threshold angle. The controller may enable the first beam based on the determined minimum arc angle being greater than or equal to the threshold angle for each of the plurality of points within the first region. To reduce gaps in the service area resulting from disabling the first beam, a second satellite in the NGSO satellite constellation may direct one or more other beams to one or more portions of the beam coverage area associated with the first beam.

For some implementations, rather than disable the first beam, the first satellite may redirect (e.g., using beam steering and/or beam shaping techniques) the first beam to another coverage area such that the minimum arc angles associated with the other coverage area are greater than or equal to the threshold angle. By redirecting the first beam, as opposed to disabling the first beam, the first beam may provide partial coverage for the existing beam coverage area, provide additional coverage to other coverage areas of the satellite for which the minimum arc angle criterion is not violated, and/or provide additional coverage to coverage areas of other satellites.

For other implementations, if the minimum arc angle is less than the threshold angle, then the first satellite may reduce a power flux density (PFD) of the first beam and/or modify a shape or size of the first beam. In some aspects, the PFD of the first beam may be reduced by decreasing a power level of the first beam.

Aspects of the disclosure are described in the following description and related drawings directed to specific examples. Alternate examples may be devised without departing from the scope of the disclosure. Additionally, well-known elements will not be described in detail or will be omitted so as not to obscure the relevant details of the disclosure.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Further, many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the various aspects of the present disclosure. In other instances, well-known circuits and devices are shown in block diagram form to avoid obscuring the present disclosure. The various aspects of the present disclosure are not to be construed as limited to specific examples described herein but rather to include within their scopes all implementations defined by the appended claims.

FIG. 1 illustrates an example of a satellite communication system 100 which includes a plurality of satellites (although only one satellite 300 is shown for clarity of illustration) in non-geosynchronous orbits, for example, low-earth orbits (LEO), a gateway 200 in communication with the satellite 300, a plurality of user terminals (UTs) 400 and 401 in communication with the satellite 300, and a plurality of user equipment (UE) 500 and 501 in communication with the UTs 400 and 401, respectively. Each UE 500 or 501 may be a user device such as a mobile device, a telephone, a smartphone, a tablet, a laptop computer, a computer, a wearable device, a smart watch, an audiovisual device, or any device including the capability to communicate with a UT. Additionally, the UE 500 and/or UE 501 may be a device (e.g., access point, small cell, etc.) that is used to communicate to one or more end user devices. In the example illustrated in FIG. 1, the UT 400 and the UE 500 communicate with each other via a bidirectional access link (having a forward access link and return access link), and similarly, the UT 401 and the UE 501 communicate with each other via another bidirectional access link. In another implementation, one or more additional UE (not shown) may be configured to receive only and therefore communicate with a UT only using a forward access link. In another implementation, one or more additional UE (not shown) may also communicate with UT 400 or UT 401. Alternatively, a UT and a corresponding UE may be integral parts of a single physical device, such as a mobile telephone with an integral satellite transceiver and an antenna for communicating directly with a satellite, for example.

The gateway 200 may have access to the Internet 108 or one or more other types of public, semiprivate or private networks. In the example illustrated in FIG. 1, the gateway 200 is in communication with infrastructure 106, which is capable of accessing the Internet 108 or one or more other types of public, semiprivate or private networks. The gateway 200 may also be coupled to various types of communication backhaul, including, for example, landline networks such as optical fiber networks or public switched telephone networks (PSTN) 110. Further, in alternative implementations, the gateway 200 may interface to the Internet 108, PSTN 110, or one or more other types of public, semiprivate or private networks without using infrastructure 106. Still further, gateway 200 may communicate with other gateways, such as gateway 201 through the infrastructure 106 or alternatively may be configured to communicate to gateway 201 without using infrastructure 106. Infrastructure 106 may include, in whole or part, a network control center (NCC), a satellite control center (SCC), a wired and/or wireless core network and/or any other components or systems used to facilitate operation of and/or communication with the satellite communication system 100.

Communications between the satellite 300 and the gateway 200 in both directions are called feeder links, whereas communications between the satellite and each of the UTs 400 and 401 in both directions are called service links. A signal path from the satellite 300 to a ground station, which may be the gateway 200 or one of the UTs 400 and 401, may be generically called a downlink. A signal path from a ground station to the satellite 300 may be generically called an uplink. Additionally, as illustrated, signals can have a general directionality such as a forward link and a return link or reverse link. Accordingly, a communication link in a direction originating from the gateway 200 and terminating at the UT 400 through the satellite 300 is called a forward link, whereas a communication link in a direction originating from the UT 400 and terminating at the gateway 200 through the satellite 300 is called a return link or reverse link. As such, the signal path from the gateway 200 to the satellite 300 is labeled "Forward Feeder Link" whereas the signal path from the satellite 300 to the gateway 200 is labeled "Return Feeder Link" in FIG. 1. In a similar manner, the signal path from each UT 400 or 401 to the satellite 300 is labeled "Return Service Link" whereas the signal path from the satellite 300 to each UT 400 or 401 is labeled "Forward Service Link" in FIG. 1.

In some implementations, the gateway 200 may transmit, to one or more corresponding satellites 300, a number of control signals and/or instructions that may cause each of the corresponding satellites 300 to selectively disable one or more satellite beams to comply with the ITU's EPFD limits for NGSO satellites in a manner that minimizes gaps in coverage provided by the corresponding satellites 300. In some aspects, these control signals and/or instructions may be generated by an EPFD compliance circuit 252 provided within, connected to, or otherwise associated with gateway 200. The EPFD compliance circuit 252 may be implemented in any suitable manner and/or may include any suitable devices or components including, for example, CPUs, ASICs, DSPs, FPGAs, and the like. For at least some example implementations, the EPFD compliance circuit 252 may be implemented (or the functions of EPFD compliance circuit 252 may be performed) by execution of one or more programs containing instructions by any suitable one or more processors. The instructions may be stored in a non-transitory computer-readable medium.

Figure 2:
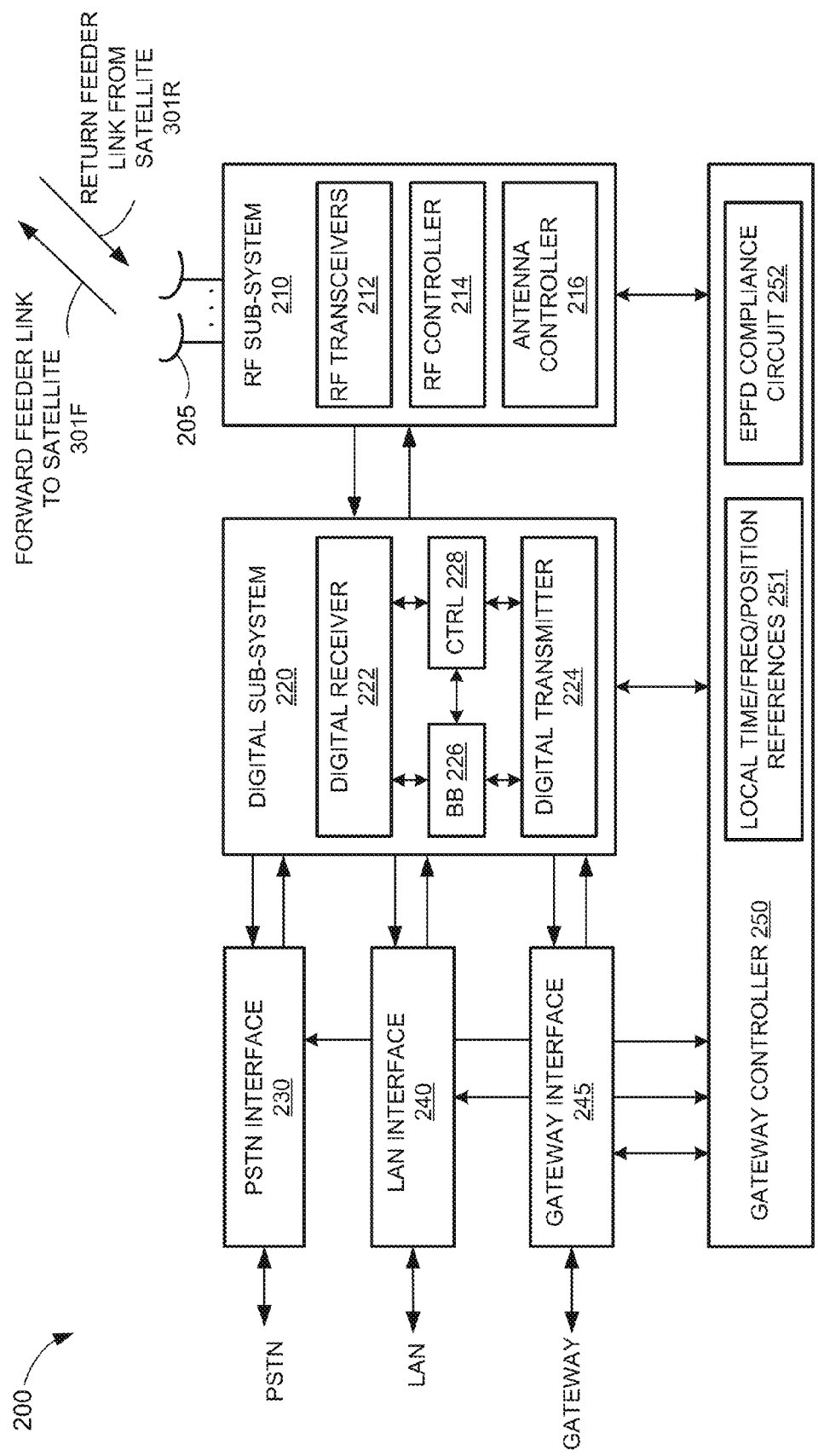
FIG. 2 shows a block diagram of one example of the gateway of FIG. 1.

FIG. 2 is an example block diagram of gateway 200, which also can apply to gateway 201 of FIG. 1. Gateway 200 is shown to include a number of antennas 205, an RF subsystem 210, a digital subsystem 220, a Public Switched Telephone Network (PSTN) interface 230, a Local Area Network (LAN) interface 240, a gateway interface 245, and a gateway controller 250. RF subsystem 210 is coupled to antennas 205 and to digital subsystem 220. Digital subsystem 220 is coupled to PSTN interface 230, to LAN interface 240, and to gateway interface 245. Gateway controller 250 is coupled to RF subsystem 210, digital subsystem 220, PSTN interface 230, LAN interface 240, and gateway interface 245.

RF subsystem 210, which may include a number of RF transceivers 212, an RF controller 214, and an antenna controller 216, may transmit communication signals to satellite 300 via a forward feeder link 301F, and may receive communication signals from satellite 300 via a return feeder link 301R. Although not shown for simplicity, each of the RF transceivers 212 may include a transmit chain and a receive chain. Each receive chain may include a low noise amplifier (LNA) and a down-converter (e.g., a mixer) to amplify and down-convert, respectively, received communication signals in a well-known manner. In addition, each receive chain may include an analog-to-digital converter (ADC) to convert the received communication signals from analog signals to digital signals (e.g., for processing by digital subsystem 220). Each transmit chain may include an up-converter (e.g., a mixer) and a power amplifier (PA) to up-convert and amplify, respectively, communication signals to be transmitted to satellite 300 in a well-known manner. In addition, each transmit chain may include a digital-to-analog converter (DAC) to convert the digital signals received from digital subsystem 220 to analog signals to be transmitted to satellite 300.

The RF controller 214 may be used to control various aspects of the number of RF transceivers 212 (e.g., selection of the carrier frequency, frequency and phase calibration, gain settings, and the like). The antenna controller 216 may control various aspects of the antennas 205 (e.g., beamforming, beam steering, gain settings, frequency tuning, and the like).

The digital subsystem 220 may include a number of digital receiver modules 222, a number of digital transmitter modules 224, a baseband (BB) processor 226, and a control (CTRL) processor 228. Digital subsystem 220 may process communication signals received from RF subsystem 210 and forward the processed communication signals to PSTN interface 230 and/or LAN interface 240, and may process communication signals received from PSTN interface 230 and/or LAN interface 240 and forward the processed communication signals to RF subsystem 210.

Each digital receiver module 222 may correspond to signal processing elements used to manage communications between gateway 200 and UT 400. One of the receive chains of RF transceivers 212 may provide input signals to multiple digital receiver modules 222. A number of digital receiver modules 222 may be used to accommodate all of the satellite beams and possible diversity mode signals being handled at any given time. Although not shown for simplicity, each digital receiver module 222 may include one or more digital data receivers, a searcher receiver, and a diversity combiner and decoder circuit. The searcher receiver may be used to search for appropriate diversity modes of carrier signals, and may be used to search for pilot signals (or other relatively fixed pattern strong signals).

The digital transmitter modules 224 may process signals to be transmitted to UT 400 via satellite 300. Although not shown for simplicity, each digital transmitter module 224 may include a transmit modulator that modulates data for transmission. The transmission power of each transmit modulator may be controlled by a corresponding digital transmit power controller (not shown for simplicity) that may (1) apply a minimum level of power for purposes of interference reduction and resource allocation and (2) apply appropriate levels of power when needed to compensate for attenuation in the transmission path and other path transfer characteristics.

The control processor 228, which is coupled to digital receiver modules 222, digital transmitter modules 224, and baseband processor 226, may provide command and control signals to effect functions such as, but not limited to, signal processing, timing signal generation, power control, handoff control, diversity combining, and system interfacing.

The control processor 228 may also control the generation and power of pilot, synchronization, and paging channel signals and their coupling to the transmit power controller (not shown for simplicity). The pilot channel is a signal that is not modulated by data, and may use a repetitive unchanging pattern or non-varying frame structure type (pattern) or tone type input. For example, the orthogonal function used to form the channel for the pilot signal generally has a constant value, such as all 1's or 0's, or a well-known repetitive pattern, such as a structured pattern of interspersed 1's and 0's.

Baseband processor 226 is well known in the art and is therefore not described in detail herein. For example, the baseband processor 226 may include a variety of known elements such as (but not limited to) coders, data modems, and digital data switching and storage components.

The PSTN interface 230 may provide communication signals to, and receive communication signals from, an external PSTN either directly or through additional infrastructure 106, as illustrated in FIG. 1. The PSTN interface 230 is well known in the art, and therefore is not described in detail herein. For other implementations, the PSTN interface 230 may be omitted, or may be replaced with any other suitable interface that connects gateway 200 to a ground-based network (e.g., the Internet).

The LAN interface 240 may provide communication signals to, and receive communication signals from, an external LAN. For example, LAN interface 240 may be coupled to the internet 108 either directly or through additional infrastructure 106, as illustrated in FIG. 1. The LAN interface 240 is well known in the art, and therefore is not described in detail herein.

The gateway interface 245 may provide communication signals to, and receive communication signals from, one or more other gateways associated with the satellite communication system 100 of FIG. 1 (and/or to/from gateways associated with other satellite communication systems, not shown for simplicity). For some implementations, gateway interface 245 may communicate with other gateways via one or more dedicated communication lines or channels (not shown for simplicity). For other implementations, gateway interface 245 may communicate with other gateways using PSTN 110 and/or other networks such as the Internet 108 (see also FIG. 1). For at least one implementation, gateway interface 245 may communicate with other gateways via infrastructure 106.

Overall gateway control may be provided by gateway controller 250. The gateway controller 250 may plan and control utilization of satellite 300's resources by gateway 200. For example, the gateway controller 250 may analyze trends, generate traffic plans, allocate satellite resources, monitor (or track) satellite positions, and monitor the performance of gateway 200 and/or satellite 300. The gateway controller 250 may also be coupled to a ground-based satellite controller (not shown for simplicity) that maintains and monitors orbits of satellite 300, relays satellite usage information to gateway 200, tracks the positions of satellite 300, and/or adjusts various channel settings of satellite 300.

For the example implementation illustrated in FIG. 2, the gateway controller 250 includes a local time, frequency, and position references 251, which may provide local time and frequency information to the RF subsystem 210, the digital subsystem 220, and/or the interfaces 230, 240, and 245. The time and frequency information may be used to synchronize the various components of gateway 200 with each other and/or with satellite(s) 300. The local time, frequency, and position references 251 may also provide position information (e.g., ephemeris data) of satellite(s) 300 to the various components of gateway 200. Further, although depicted in FIG. 2 as included within gateway controller 250, for other implementations, the local time, frequency, and position references 251 may be a separate subsystem that is coupled to gateway controller 250 (and/or to one or more of digital subsystem 220 and RF subsystem 210).

In the example implementation depicted in FIG. 2, the gateway controller 250 may include an EPFD compliance circuit 252 to generate a number of control signals and/or instructions that, when transmitted to one or more corresponding satellites 300, may cause each of the corresponding satellites 300 to selectively disable one or more beams to comply with the ITU's EPFD limits for NGSO satellites. As described in more detail below, each of the corresponding satellites 300 may selectively disable one or more of its satellite beams, based on the received control signals and/or instructions, in a manner that minimizes gaps in coverage provided by the corresponding satellites 300.

Although not shown in FIG. 2 for simplicity, the gateway controller 250 may also be coupled to a network control center (NCC) and/or a satellite control center (SCC). For example, the gateway controller 250 may allow the SCC to communicate directly with satellite(s) 300, for example, to retrieve ephemeris data from satellite(s) 300. The gateway controller 250 may also receive processed information (e.g., from the SCC and/or the NCC) that allows gateway controller 250 to properly aim its antennas 205 (e.g., at the appropriate satellite(s) 300), to schedule beam transmissions, to coordinate handovers, and to perform various other well-known functions. For at least some implementations, the NCC and/or the SCC may include a number of EPFD compliance circuits 252 to generate the control signals and/or instructions for a number of satellites 300 (or for all satellites 300) in an associated NGSO satellite constellation. The NCC and/or the SCC may transmit the control signals and/or instructions to the satellites 300 via one or more gateways such as gateway 200. In some aspects, the EPFD compliance circuits 252 may reside within the NCC and/or the SCC, and gateway 200 may not include the EPFD compliance circuit 252.

Figure 3:
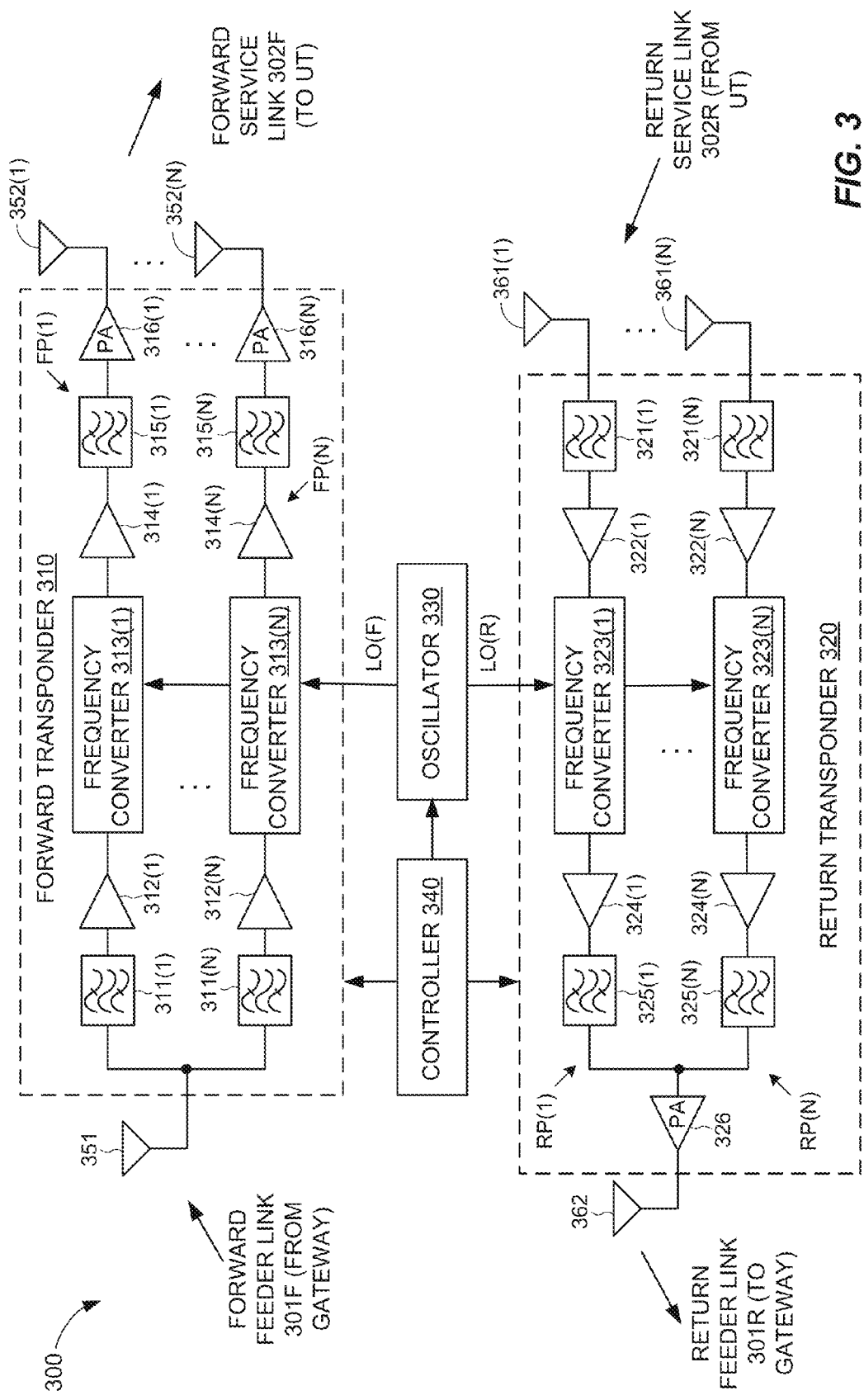
FIG. 3 shows a block diagram of one example of the satellite of FIG. 1.

FIG. 3 is an example block diagram of satellite 300 for illustrative purposes only. It will be appreciated that specific satellite configurations can vary significantly and may or may not include on-board processing. Further, although illustrated as a single satellite, two or more satellites using inter-satellite communication may provide the functional connection between the gateway 200 and UT 400. It will be appreciated that disclosure is not limited to any specific satellite configuration and any satellite or combinations of satellites that can provide the functional connection between the gateway 200 and UT 400 can be considered within the scope of the disclosure. In one example, satellite 300 is shown to include a forward transponder 310, a return transponder 320, an oscillator 330, a controller 340, forward link antennas 351-352, and return link antennas 361-362. The forward transponder 310, which may process communication signals within a corresponding channel or frequency band, may include a respective one of first bandpass filters 311(1)-311(N), a respective one of first LNAs 312(1)-312(N), a respective one of frequency converters 313(1)-313(N), a respective one of second LNAs 314(1)-314(N), a respective one of second bandpass filters 315(1)-315(N), and a respective one of PAs 316(1)-316(N). Each of the PAs 316(1)-316(N) is coupled to a respective one of antennas 352(1)-352(N), as shown in FIG. 3.

Within each of the respective forward paths FP(1)-FP(N), the first bandpass filter 311 passes signal components having frequencies within the channel or frequency band of the respective forward path FP, and filters signal components having frequencies outside the channel or frequency band of the respective forward path FP. Thus, the pass band of the first bandpass filter 311 corresponds to the width of the channel associated with the respective forward path FP. The first LNA 312 amplifies the received communication signals to a level suitable for processing by the frequency converter 313. The frequency converter 313 converts the frequency of the communication signals in the respective forward path FP (e.g., to a frequency suitable for transmission from satellite 300 to UT 400). The second LNA 314 amplifies the frequency-converted communication signals, and the second bandpass filter 315 filters signal components having frequencies outside of the associated channel width. The PA 316 amplifies the filtered signals to a power level suitable for transmission to UTs 400 via respective antenna 352. The return transponder 320, which includes a number N of return paths RP(1)-RP(N), receives communication signals from UT 400 along return service link 302R via antennas 361(1)-

361(N), and transmits communication signals to gateway 200 along return feeder link 301R via one or more antennas 362. Each of the return paths RP(1)-RP(N), which may process communication signals within a corresponding channel or frequency band, may be coupled to a respective one of antennas 361(1)-361(N), and may include a respective one of first bandpass filters 321(1)-321(N), a respective one of first LNAs 322(1)-322(N), a respective one of frequency converters 323(1)-323(N), a respective one of second LNAs 324(1)-324(N), and a respective one of second bandpass filters 325(1)-325(N).

Within each of the respective return paths RP(1)-RP(N), the first bandpass filter 321 passes signal components having frequencies within the channel or frequency band of the respective return path RP, and filters signal components having frequencies outside the channel or frequency band of the respective return path RP. Thus, the pass band of the first bandpass filter 321 may for some implementations correspond to the width of the channel associated with the respective return path RP. The first LNA 322 amplifies all the received communication signals to a level suitable for processing by the frequency converter 323. The frequency converter 323 converts the frequency of the communication signals in the respective return path RP (e.g., to a frequency suitable for transmission from satellite 300 to gateway 200). The second LNA 324 amplifies the frequency-converted communication signals, and the second bandpass filter 325 filters signal components having frequencies outside of the associated channel width. Signals from the return paths RP(1)-RP(N) are combined and provided to the one or more antennas 362 via a PA 326. The PA 326 amplifies the combined signals for transmission to the gateway 200.

Oscillator 330, which may be any suitable circuit or device that generates an oscillating signal, provides a forward local oscillator signal LO(F) to the frequency converters 313(1)-313(N) of forward transponder 310, and provides a return local oscillator signal LO(R) to frequency converters 323(1)-323(N) of return transponder 320. For example, the LO(F) signal may be used by frequency converters 313(1)-313(N) to convert communication signals from a frequency band associated with the transmission of signals from gateway 200 to satellite 300 to a frequency band associated with the transmission of signals from satellite 300 to UT 400. The LO(R) signal may be used by frequency converters 323(1)-323(N) to convert communication signals from a frequency band associated with the transmission of signals from UT 400 to satellite 300 to a frequency band associated with the transmission of signals from satellite 300 to gateway 200.

Controller 340, which is coupled to forward transponder 310, return transponder 320, and oscillator 330, may control various operations of satellite 300 including (but not limited to) channel allocations. In one aspect, the controller 340 may include a memory coupled to a processor (not shown for simplicity). The memory may include a non-transitory computer-readable medium (e.g., one or more nonvolatile memory elements, such as EPROM, EEPROM, Flash memory, a hard drive, etc.) storing instructions that, when executed by the processor, cause the satellite 300 to perform operations including (but not limited to) those described herein with respect to FIGS. 10 and 11.

Figure 4:
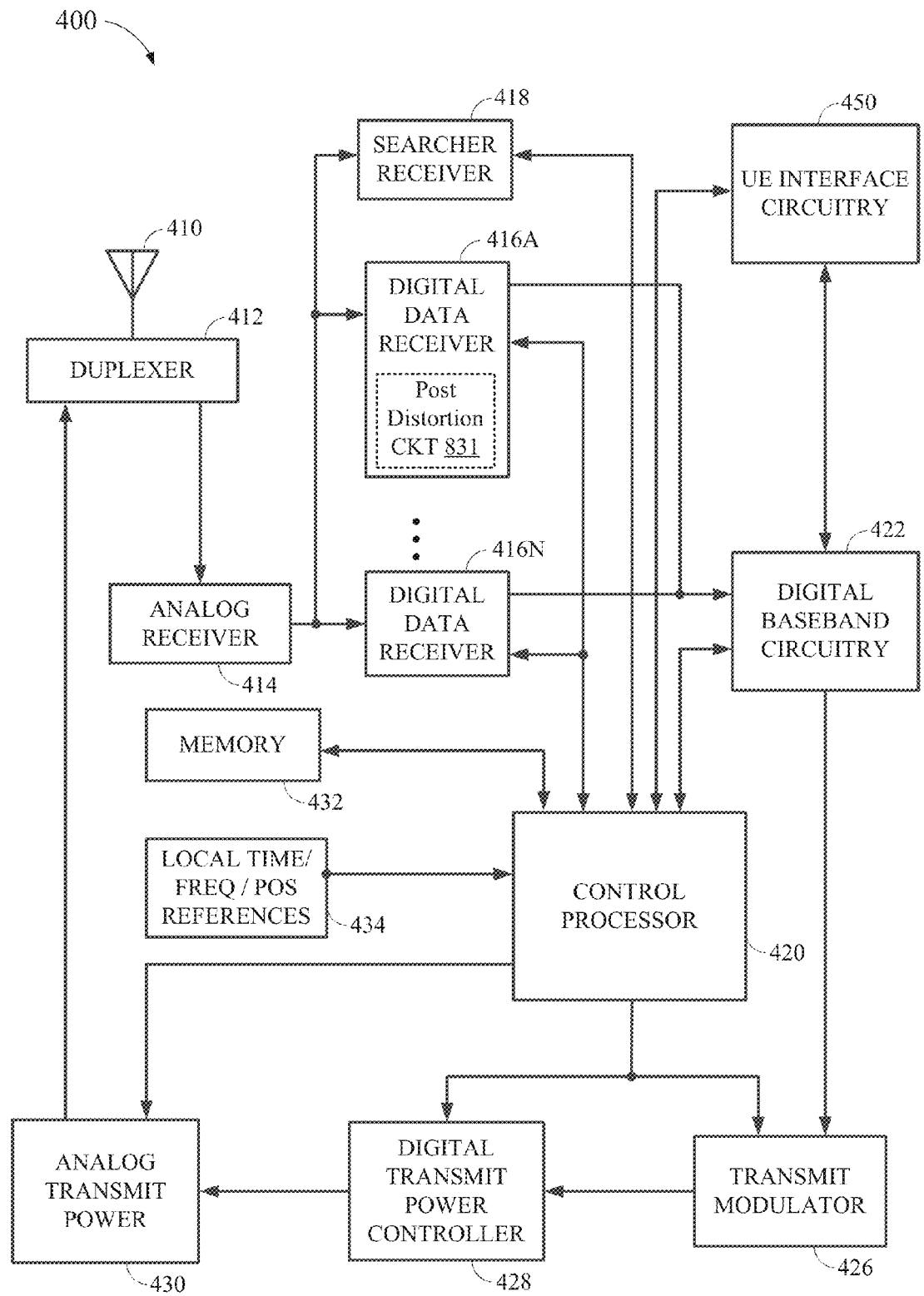
FIG. 4 shows a block diagram of one example of the user terminal (UT) of FIG. 1.

An example of a transceiver for use in the UT 400 or 401 is illustrated in FIG. 4. In FIG. 4, at least one antenna 410 is provided for receiving forward link communication signals (e.g., from satellite 300), which are transferred to an analog receiver 414, where they are down-converted, amplified, and digitized. A duplexer element 412 is often used to allow the same antenna to serve both transmit and receive functions. Alternatively, a UT transceiver may employ separate antennas for operating at different transmit and receive frequencies.

The digital communication signals output by the analog receiver 414 are transferred to at least one digital data receiver 416A and at least one searcher receiver 418. Additional digital data receivers to 416N can be used to obtain desired levels of signal diversity, depending on the acceptable level of transceiver complexity, as would be apparent to one skilled in the relevant art.

At least one user terminal control processor 420 is coupled to digital data receivers 416A-416N and searcher receiver 418. The control processor 420 provides, among other functions, basic signal processing, timing, power and handoff control or coordination, and selection of frequency used for signal carriers. Another basic control function that may be performed by the control processor 420 is the selection or manipulation of functions to be used for processing various signal waveforms. Signal processing by the control processor 420 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The outputs of digital data receivers 416A-416N are coupled to digital baseband circuitry 422 within the user terminal. The digital baseband circuitry 422 comprises processing and presentation elements used to transfer information to and from UE 500 as shown in FIG. 1, for example. Referring to FIG. 4, if diversity signal processing is employed, the digital baseband circuitry 422 may comprise a diversity combiner and decoder. Some of these elements may also operate under the control of, or in communication with, a control processor 420.

When voice or other data is prepared as an output message or communications signal originating with the user terminal, the digital baseband circuitry 422 is used to receive, store, process, and otherwise prepare the desired data for transmission. The digital baseband circuitry 422 provides this data to a transmit modulator 426 operating under the control of the control processor 420. The output of the transmit modulator 426 is transferred to a power controller 428 which provides output power control to a transmit power amplifier 430 for final transmission of the output signal from the antenna 410 to a satellite (e.g., satellite 300).

In FIG. 4, the UT transceiver also includes a memory 432 associated with the control processor 420. The memory 432 may include instructions for execution by the control processor 420 as well as data for processing by the control processor 420.

In the example illustrated in FIG. 4, the UT 400 also includes an optional local time, frequency and/or position references 434 (e.g., a GPS receiver), which may provide local time, frequency and/or position information to the control processor 420 for various applications, including, for example, time and frequency synchronization for the UT 400.

Digital data receivers 416A-N and searcher receiver 418 are configured with signal correlation elements to demodulate and track specific signals. Searcher receiver 418 is used to search for pilot signals, or other relatively fixed pattern strong signals, while digital data receivers 416A-N are used to demodulate other signals associated with detected pilot signals. However, a digital data receiver 416 can be assigned to track the pilot signal after acquisition to accurately determine the ratio of signal chip energies to signal noise, and to formulate pilot signal strength. Therefore, the outputs of these units can be monitored to determine the energy in, or frequency of, the pilot signal or other signals. These receivers also employ frequency tracking elements that can be monitored to provide current frequency and timing information to control processor 420 for signals being demodulated.

The control processor 420 may use such information to determine to what extent the received signals are offset from the oscillator frequency, when scaled to the same frequency band, as appropriate. This and other information related to frequency errors and frequency shifts can be stored in a storage or memory element 432 as desired.

The control processor 420 may also be coupled to UE interface circuitry 450 to allow communications between UT 400 and one or more UEs. UE interface circuitry 450 may be configured as desired for communication with various UE configurations and accordingly may include various transceivers and related components depending on the various communication technologies employed to communicate with the various UEs supported. For example, UE interface circuitry 450 may include one or more antennas, a wide area network (WAN) transceiver, a wireless local area network (WLAN) transceiver, a Local Area Network (LAN) interface, a Public Switched Telephone Network (PSTN) interface and/or other known communication technologies configured to communicate with one or more UEs in communication with UT 400.

Figure 5:
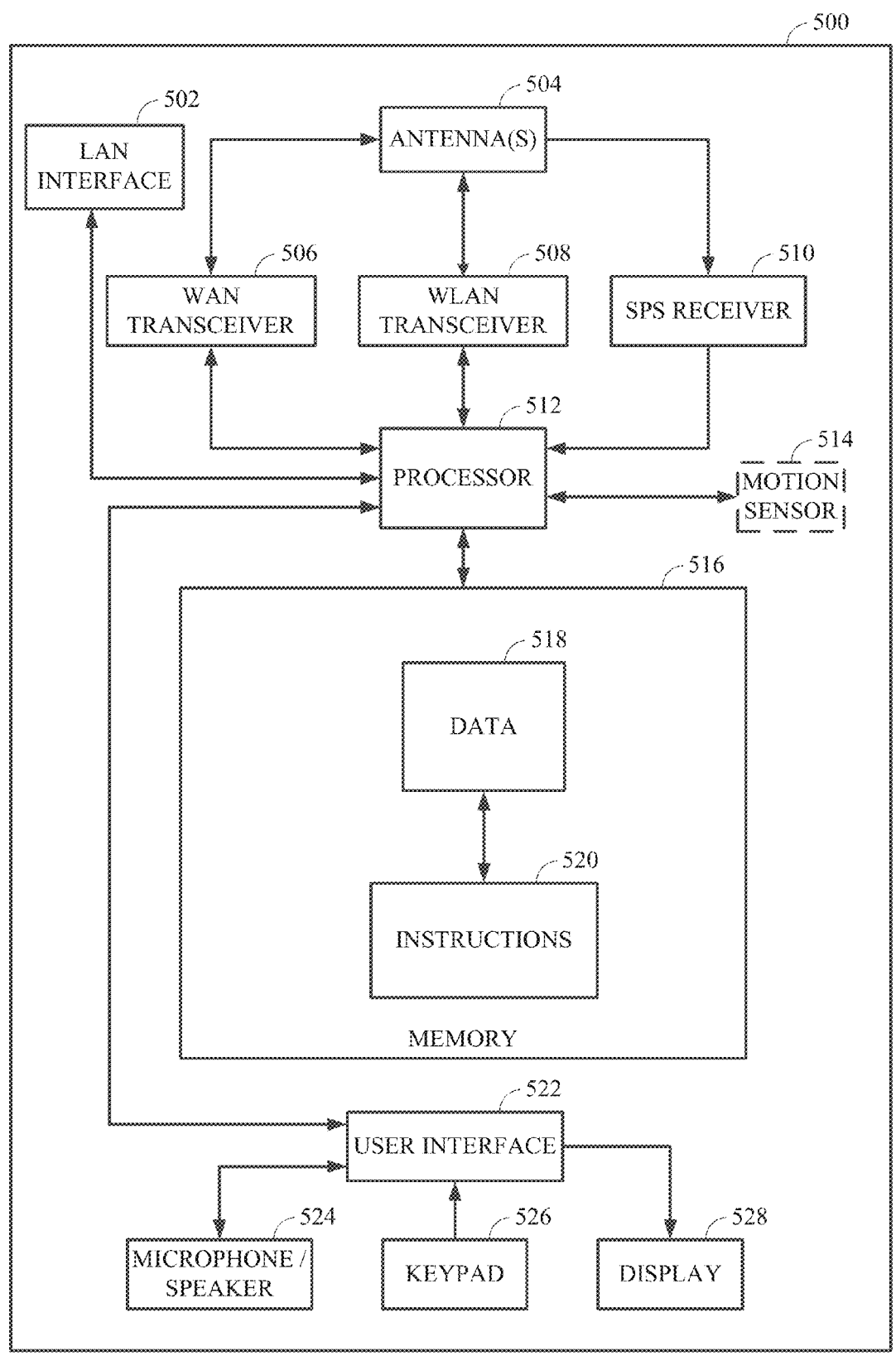
FIG. 5 shows a block diagram of one example of the user equipment (UE) of FIG. 1.

FIG. 5 is a block diagram illustrating an example of UE 500, which also can apply to UE 501 of FIG. 1. The UE 500 as shown in FIG. 5 may be a mobile device, a handheld computer, a tablet, a wearable device, a smart watch, or any type of device capable of interacting with a user, for example. Additionally, the UE may be a network side device that provides connectivity to various ultimate end user devices and/or to various public or private networks. In the example shown in FIG. 5, the UE 500 may comprise a LAN interface 502, one or more antennas 504, a wide area network (WAN) transceiver 506, a wireless local area network (WLAN) transceiver 508, and a satellite positioning system (SPS) receiver 510. The SPS receiver 510 may be compatible with the Global Positioning System (GPS), the Global Navigation Satellite System (GLONASS) and/or any other global or regional satellite based positioning system. In an alternate aspect, the UE 500 may include a WLAN transceiver 508, such as a Wi-Fi transceiver, with or without the LAN interface 502, WAN transceiver 506, and/or SPS receiver 510, for example. Further, UE 500 may include additional transceivers such as Bluetooth, ZigBee and other known technologies, with or without the LAN interface 502, WAN transceiver 506, WLAN transceiver 508 and/or SPS receiver 510. Accordingly, the elements illustrated for UE 500 are provided merely as an example configuration and are not intended to limit the configuration of UEs in accordance with the various aspects disclosed herein.

In the example shown in FIG. 5, a processor 512 is connected to the LAN interface 502, the WAN transceiver 506, the WLAN transceiver 508 and the SPS receiver 510. Optionally, a motion sensor 514 and other sensors may also be coupled to the processor 512.

A memory 516 is connected to the processor 512. In one aspect, the memory 516 may include data 518 which may be transmitted to and/or received from the UT 400, as shown in FIG. 1. Referring to FIG. 5, the memory 516 may also include stored instructions 520 to be executed by the processor 512 to perform the process steps for communicating with the UT 400, for example. Furthermore, the UE 500 may also include a user interface 522, which may include hardware and software for interfacing inputs or outputs of the processor 512 with the user through light, sound or tactile inputs or outputs, for example. In the example shown in FIG. 5, the UE 500 includes a microphone/speaker 524, a keypad 526, and a display 528 connected to the user interface 522. Alternatively, the user's tactile input or output may be integrated with the display 528 by using a touch-screen display, for example. Once again, the elements illustrated in FIG. 5 are not intended to limit the configuration of the UEs disclosed herein and it will be appreciated that the elements included in the UE 500 will vary based on the end use of the device and the design choices of the system engineers.

Additionally, the UE 500 may be a user device such as a mobile device or external network side device in communication with but separate from the UT 400 as illustrated in FIG. 1, for example. Alternatively, the UE 500 and the UT 400 may be integral parts of a single physical device.

As mentioned above, GSO satellites are deployed in geostationary orbits at approximately 35,000 km above the Earth's surface, and revolve around the Earth in an equatorial orbit at the Earth's own angular velocity. In contrast, NGSO satellites are deployed in non-geostationary orbits and revolve around the Earth above various paths of the Earth's surface at relatively low altitudes (e.g., as compared with GSO satellites).

Figure 6:
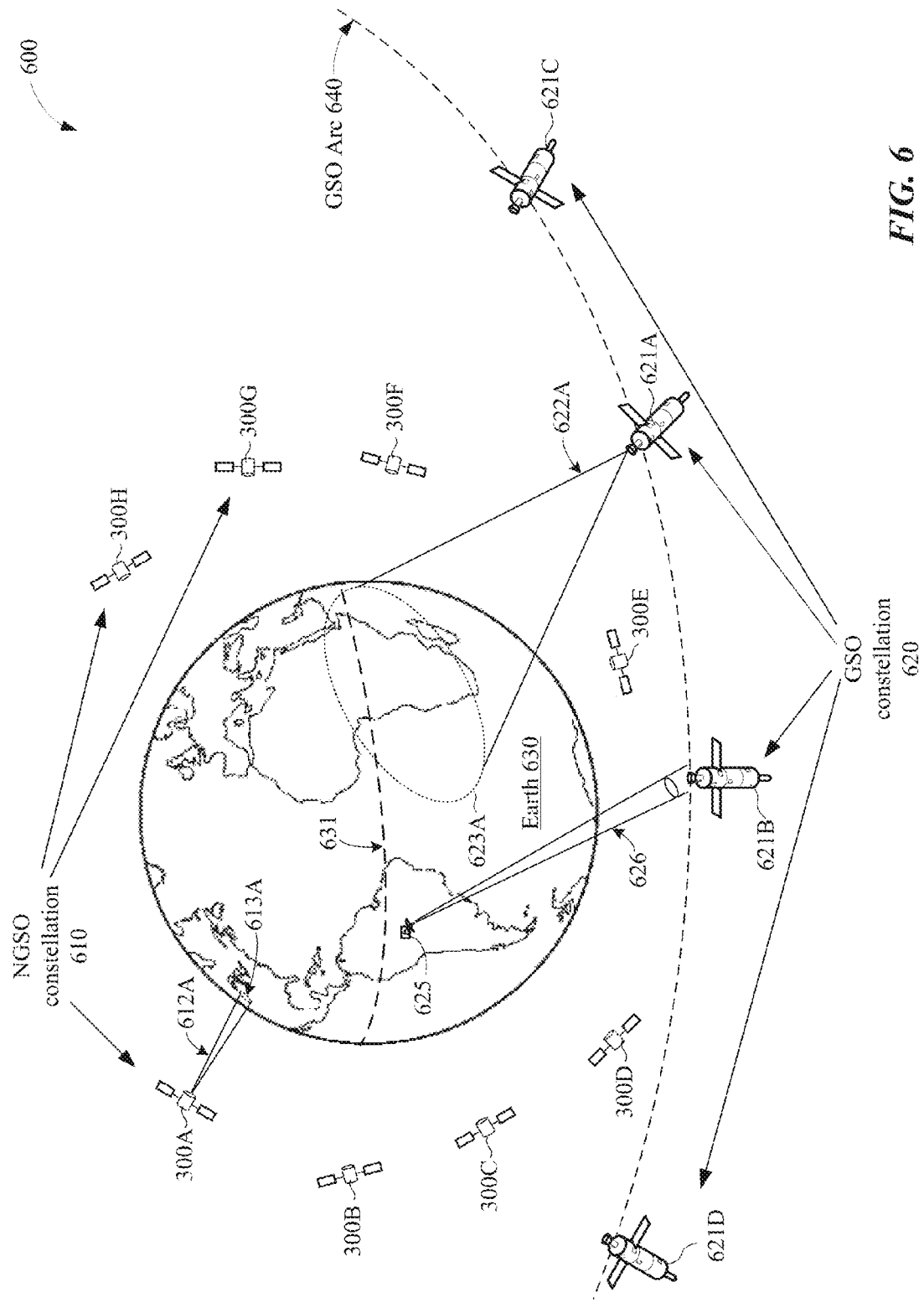
FIG. 6 shows a diagram depicting an NGSO satellite constellation and a GSO satellite constellation orbiting the Earth.

For example, FIG. 6 shows a diagram 600 depicting a first constellation 610 of NGSO satellites 300A-300H and a second constellation 620 of GSO satellites 621A-621D in orbit around Earth 630. Although depicted in FIG. 6 as including only eight NGSO satellites 300A-300H, the first constellation 610 may include any suitable number of NGSO satellites, for example, to provide world-wide satellite coverage. For some implementations, the first constellation 610 may include between 600 and 900 NGSO satellites. Similarly, although depicted in FIG. 6 as including only four GSO satellites 621A-621D, the second constellation 620 may include any suitable number of GSO satellites, for example, to provide world-wide satellite coverage. In addition, although not shown in FIG. 6 for simplicity, one or more other constellations of GSO satellites and/or one or more other constellations of NGSO satellites may be in orbit above Earth 630.

The first constellation 610, which may hereinafter be referred to as the NGSO satellite constellation 610, may provide a first satellite service to most, if not all, areas on Earth 630. The second constellation 620, which may hereinafter be referred to as the GSO satellite constellation 620, may provide a second satellite service to large portions of Earth 630. The first satellite service may be different than the second satellite service. For some aspects, the first satellite service provided by the NGSO satellite constellation 610 may correspond to a global broadband Internet service, and the second satellite service provided by the GSO satellite constellation 620 may correspond to a satellite-based broadcast (e.g., television) service. Further, for at least some implementations, each of NGSO satellites 300A-300H may be one example of satellite 300 of FIGS. 1 and 3.

The NGSO satellites 300A-300H may orbit the Earth 630 in any suitable number of non-geosynchronous orbital planes (not shown for simplicity), and each of the orbital planes may include a plurality of NGSO satellites (e.g., such as one or more of the NGSO satellites 300A-300H). The non-geosynchronous orbital planes may include, for example, polar orbital patterns and/or Walker orbital patterns. Thus, to a stationary observer on Earth 630, the NGSO satellites 300A-300H appear to move quickly across the sky in a plurality of different paths across the Earth's surface, with each of the NGSO satellites 300A-300H providing coverage for a corresponding path across the earth's surface.

In contrast, the GSO satellites 621A-621D may be in a geosynchronous orbit around Earth 630 and thus, to a stationary observer on Earth 630, may appear motionless in a fixed position in the sky located above the Earth's equator 631. Each of the GSO satellites 621A-621D maintains a relatively fixed line-of-sight with a corresponding GSO ground station on Earth 630. For example, GSO satellite 621B is depicted in FIG. 6 as maintaining a relatively fixed line-of-sight with a GSO ground station 625. It is noted that for a given point on the surface of Earth 630, there may be an arc of positions in the sky along which the GSO satellites 621A-621D may be located. This arc of GSO satellite positions may be referred to herein as the GSO arc 640. The receiving area for a GSO ground station (e.g., such as GSO ground station 625) may be defined by an antenna pattern of typically fixed orientation and fixed beam width (such as a beam width defined by an ITU specification). For example, the GSO ground station 625 is depicted as directing a beam 626 towards GSO satellite 621B.

In some aspects, each of the NGSO satellites 300A-300H may include a number of directional antennas to provide high-speed forward links (e.g., downlinks) with user terminals such as UT 400 of FIG. 1 and/or with gateways such as gateway 200 of FIG. 1. A high-gain directional antenna achieves higher data rates and is less susceptible to interference than an omni-directional antenna by focusing radiation into a relatively narrow beam width (as compared to the relatively wide beam width associated with an omni-directional antenna). For example, as depicted in FIG. 6, the coverage area 613A provided by a beam 612A transmitted from NGSO satellite 300A may be relatively small compared to the coverage area 623A provided by a beam 622A transmitted from GSO satellite 621A. Accordingly, although not shown in FIG. 6 for simplicity, the footprint of each of NGSO satellites 300A-300H may be significantly smaller than the footprint of each of GSO satellites 621A-621D.

Because the NGSO satellites 300A-300H may communicate with UTs and ground-based gateways (not shown in FIG. 6 for simplicity) using at least part of the same frequency spectrum used by GSO satellites 621A-621D, the NGSO satellites 300A-300H are not to exceed the EPFD limits established by the ITU. A given NGSO satellite most likely risks exceeding the EPFD limits and potentially interfering with GSO satellite communications if transmissions from both the given NGSO satellite and the GSO satellite are received at a point on the Earth's surface within the receiving area of a GSO ground station, for example, as defined by the GSO ground station's beam pattern (e.g., antenna pattern). For the example of FIG. 6, the beam pattern 626 of GSO ground station 625 may be defined by a line from the GSO ground station 625 to the GSO satellite 621B and an associated angular beam width. NGSO satellites 300A-300H may determine whether their transmissions are likely to exceed the EPFD limits and/or interfere with GSO satellite communications by comparing angles between the GSO arc, the GSO ground station, and the NGSO satellite, and then determining if the angles fall within the GSO ground station's beam pattern. Because of the relatively large footprints of the GSO satellites 621A-621D and the relatively large number of satellites in the NGSO satellite constellation 610, complying with the EPFD limits established by the ITU is, although challenging, important to the operation of the NGSO satellite constellation 610.

Figure 7A:
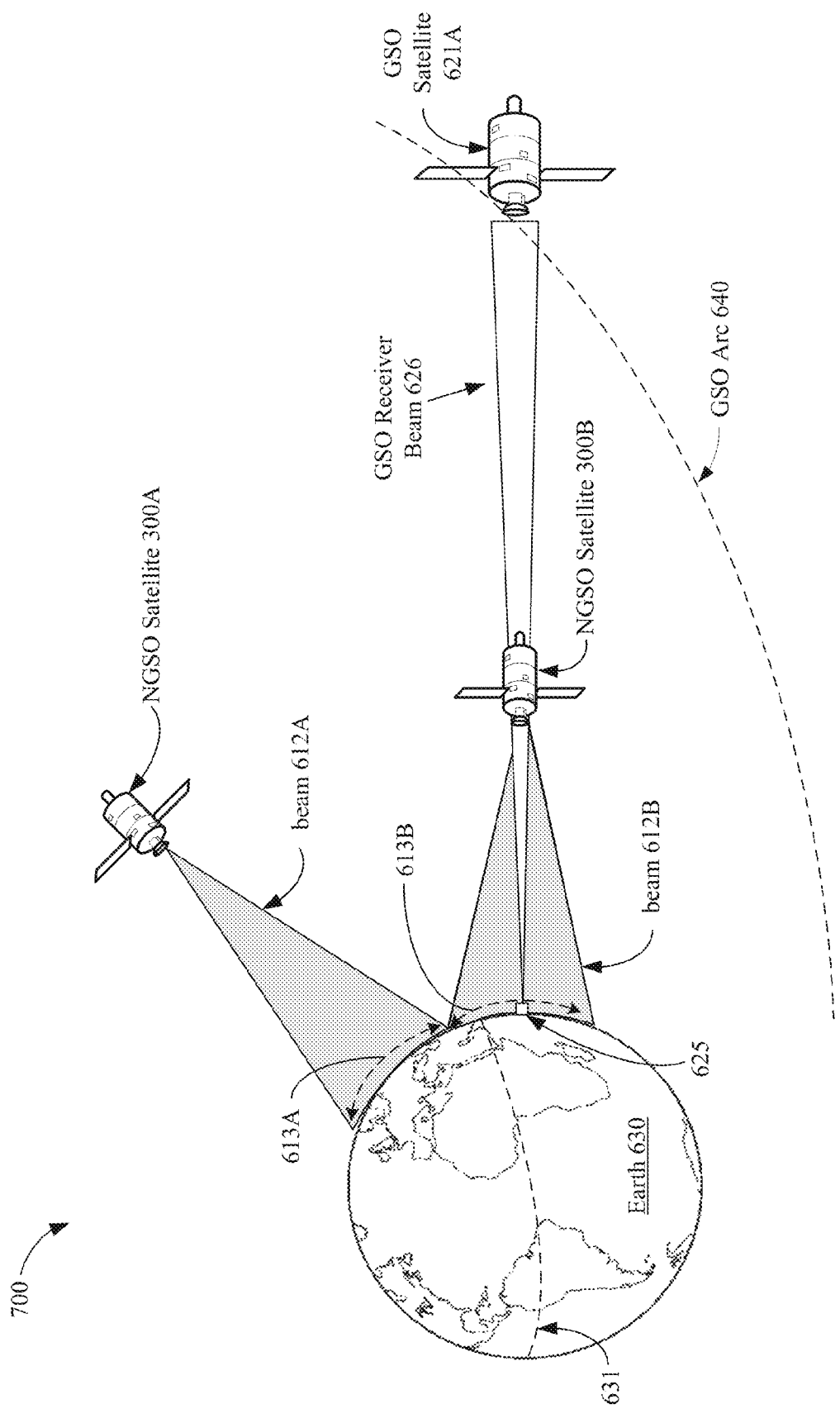
FIG. 7A depicts example positions of two NGSO satellites with respect to a GSO satellite and the Earth.

Referring also to the example depiction 700 of FIG. 7A, a first NGSO satellite 300A is depicted as directing beam 612A towards a first coverage area 613A on the Earth's surface, and a second NGSO satellite 300B is depicted as directing beam 612B towards a second coverage area 613B on the Earth's surface. For actual implementations, the NGSO satellites 300A and/or 300B may each transmit any number of beams, and one or more of the beams may be directed towards overlapping regions on the Earth's surface. As used herein, the footprint of a satellite is the surface area (on Earth) within which all UTs can communicate with the satellite (above a minimum elevation angle). The area covered by a beam transmitted (e.g., from a corresponding antenna) of the satellite is referred to herein as the beam coverage area. Thus, the footprint of a satellite may be defined by a number of beam coverage areas provided by a number of beams transmitted from the satellite.

More specifically, for the example of FIG. 7A, considering the second NGSO satellite 300B, the second NGSO satellite 300B may determine, for each point within the coverage areas of its beams on the Earth's surface (as an example, the coverage area 613B of the beam 612B), an angle between a first line extending from the point on Earth to the second NGSO satellite 300B and each of a plurality of second lines extending from the point on Earth to positions along the GSO arc 640 (e.g., the positions along the GSO arc 640 corresponding to possible locations of GSO satellites). For simplicity, the first and second lines are not shown in FIG. 7A. The determined angles may be referred to herein as the "arc angles (a)." Then, for the point on Earth, a minimum of the arc angles may be determined. This process may be repeated for all points within the coverage areas of the beams of second NGSO satellite 300B. Then, if the minimum arc angles are less than a threshold angle (e.g., 2°) for any point on Earth 630 within the beam coverage areas, the second NGSO satellite 300B may disable its interfering beams to avoid potential interference with GSO satellite communications.

Figure 7B:
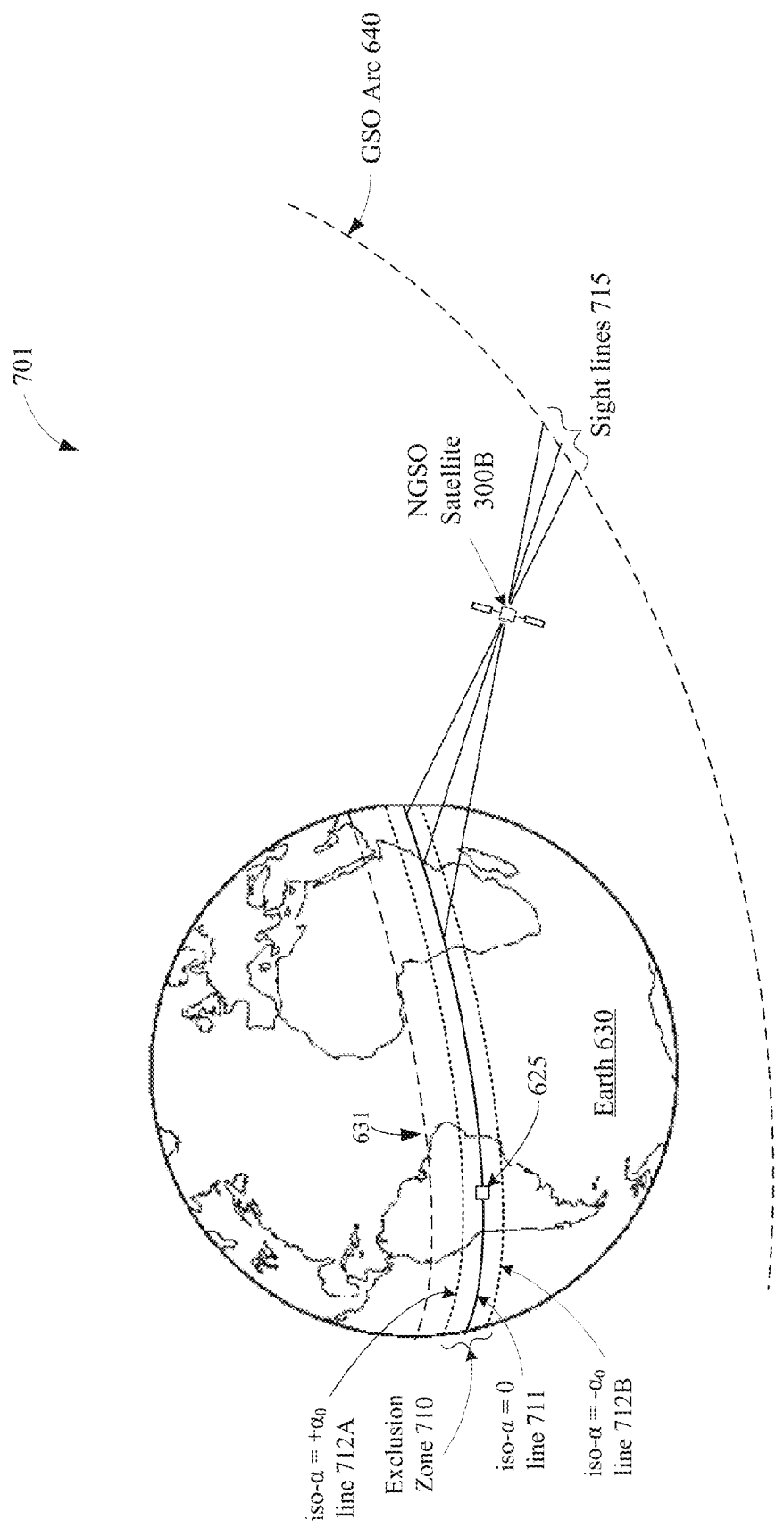
FIG. 7B depicts an example exclusion zone that may be defined in accordance with the ITU's guidelines on EPFD limits.

The determined arc angles may correspond to an exclusion zone defined in accordance with the ITU's guidelines on EPFD limits for NGSO satellites. For example, FIG. 7B shows a diagram 701 depicting an example exclusion zone 710 that may be defined, in accordance with the ITU's guidelines on EPFD limits, for the example GSO ground station 625. From the field of view of the second NGSO satellite 300B, three iso-α lines 711 and 712A-712B may be "drawn" on the surface of Earth 630. Each of the iso-α lines 711 and 712A-712B may represent points on the surface of Earth 630 that share the same value of the arc angle α. More specifically, a first iso-α line 711 may represent points on the surface of Earth 630 for which α=0. The first iso-α line 711 may be defined by a plurality of sight lines 715 extending from points on the GSO arc 640 through NGSO satellite 300B to points on Earth 630. The points on Earth corresponding to sight lines 715 may then be used to define the first iso-α line 711 (e.g., for which the value of α=0). A second iso-α line 712A may represent points on the surface of Earth 630 for which α=+α$_0$, and a third iso-α line 712B may represent points on the surface of Earth 630 for which α=−α$_0$. The value of α$_0$, which may be the threshold angle described above with respect to FIG. 7A, may correspond to a specified EPFD limit. In some aspects, the specified EPFD limit may be approximately −160 dB (W/Hz). The exclusion zone 710 may then be defined as the surface area on Earth 630 lying between the "boundary" iso-α lines 712A-712B. Accordingly, points on Earth 630 that lie within the exclusion zone 710 may experience an EPFD value equal to or greater than the specified EPFD limit (e.g., equal to or greater than −160 dB).

Per the ITU's guidelines on EPFD limits for NGSO satellites, the second NGSO satellite 300B is to disable any of its beams when one or more points on Earth see the second NGSO satellite 300B within the threshold angle $\alpha_0$ of the GSO arc 640 (e.g., for points lying within the exclusion zone 710). In other words, according to at least one conventional interference mitigation technique to comply with the ITU's EPFD limits on NGSO satellite transmissions, if the −160 dB PFD contour of a beam transmitted from second NGSO satellite 300B overlaps the exclusion zone 710, then the second NGSO satellite 300B is to turn off the beam. As used herein, a beam's PFD contour may indicate a portion of the beam's coverage area on Earth for which the beam's PFD is greater than or equal to a specified EPFD limit Thus, for example, a beam's −160 dB PFD contour may refer to the coverage area on Earth for which the beam's PFD is greater than or equal to −160 dB.

However, disabling the beams of second NGSO satellite 300B in the manner described above with respect to FIGS. 7A-7B does not take into account other factors that, if considered, may indicate that the beams of second NGSO satellite 300B do not exceed the EPFD limits and/or may not actually interfere with GSO satellite communications. For the example of FIG. 7A, specifically considering the beam 612B transmitted from second NGSO satellite 300B, the receiver beam 626 associated with GSO satellite 621A terminates within the coverage area 613B of the beam 612B, and therefore the minimum arc angles for all points on Earth 630 within the beam coverage area 613B may be close to zero. Thus, using conventional approaches to comply with the EPFD limits, the second NGSO satellite 300B would disable beam 612B until the minimum arc angles for all points on Earth 630 within the beam coverage area 613B exceed the threshold angle (e.g., due to movement of the beam coverage area 613B across the Earth's surface resulting from positional changes of the second NGSO satellite 300B along its orbit).

However, if the transmit power of the beam 612B from the second NGSO satellite 300B is below a threshold level, then the beam 612B may not interfere with the GSO satellite 621A's communications even when all of the determined arc angles are less than the threshold angle. Because disabling beam 612B may create a gap in the coverage area on Earth 630 provided by the NGSO satellite constellation 610, it is desirable for the second NGSO satellite 300B to disable beam 612B only when it actually interferes with GSO satellite communications and/or when the EPFD limits are actually exceeded (e.g., rather than automatically disabling an NGSO satellite beam when the beam's PFD contour touches the exclusion zone).

In accordance with example implementations, an NGSO satellite may consider its transmission characteristics when determining whether to disable one or more of its beams. More specifically, for each of the beams transmitted from the NGSO satellite, the beam's transmission characteristics may be used to determine (1) a first region of the beam's coverage area that may potentially interfere with GSO satellite transmissions and (2) a second region of the beam's coverage area that does not interfere with GSO satellite transmissions. Then, for each point in the first region, the minimum arc angle between the NGSO satellite and the GSO arc may be determined. If the determined minimum arc angle is less than a threshold angle for any point in the first region of the beam's coverage area, then the NGSO satellite may disable the beam. However, in contrast to conventional approaches, minimum arc angles for the second region of the beam's coverage area may not be determined, for example, because the second region of the beam's coverage area may be defined as not interfering with GSO satellite transmissions. Accordingly, in accordance with some aspects of the present disclosure, the NGSO satellite may disable the beam for which the minimum arc angle is less than the threshold angle, as measured relative to points in the first region, without considering minimum arc angles measured relative to points in the second region.

For some implementations, the NGSO satellite may redirect (e.g., using beam steering and/or beam shaping techniques) the beam for which the minimum arc angle is less than the threshold angle such that the resulting beam coverage area does not exceed the GSO interference criterion. By redirecting the beam, as opposed to disabling the beam, the beam may provide partial coverage for the existing beam coverage area, provide additional coverage to other coverage areas of the satellite for which the minimum arc angle criterion is not violated, and/or provide additional coverage to coverage areas of other satellites in the NGSO satellite constellation 610. In addition or as an alternative, one or more other NGSO satellites in the NGSO satellite constellation 610 may redirect one or more beams into portions of the coverage area of the disabled beam. The one or more other beams transmitted from the other NGSO satellites in the NGSO satellite constellation 610 may arrive at different angles than did the disabled beam, and thus the one or more other beams may have minimum arc angles that are greater than the threshold angle. As explained in more detail below, the ability to redirect one or more other beams into portions of the coverage area associated with the disabled beam may reduce gaps in the service area provided by the NGSO satellite constellation 610.

Figure 8:
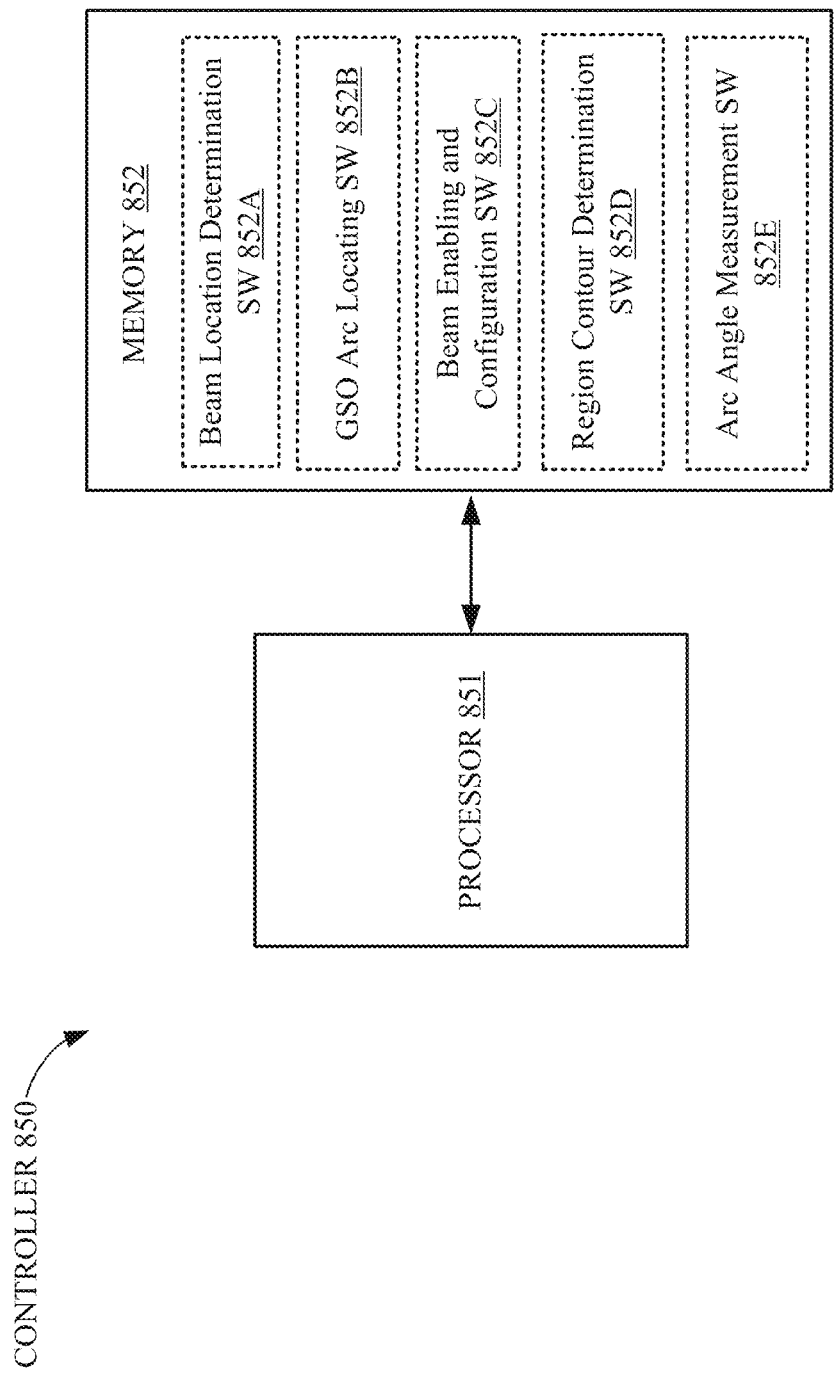
FIG. 8 shows a block diagram of an example controller in accordance with example implementations.

FIG. 8 is a block diagram of an example controller 850 in accordance with example implementations. For purposes of discussion herein, the controller 850 may be an example of (or implemented within) the gateway controller 250 of FIG. 2 and/or the controller 340 of FIG. 3. For some implementations, the controller 850 may perform the functions of the EPFD compliance circuit 252. Alternatively or as an addition, the controller 850 may be implemented within or coupled to the NCC and/or the SCC described above with respect to FIG. 2.

Figure 11:
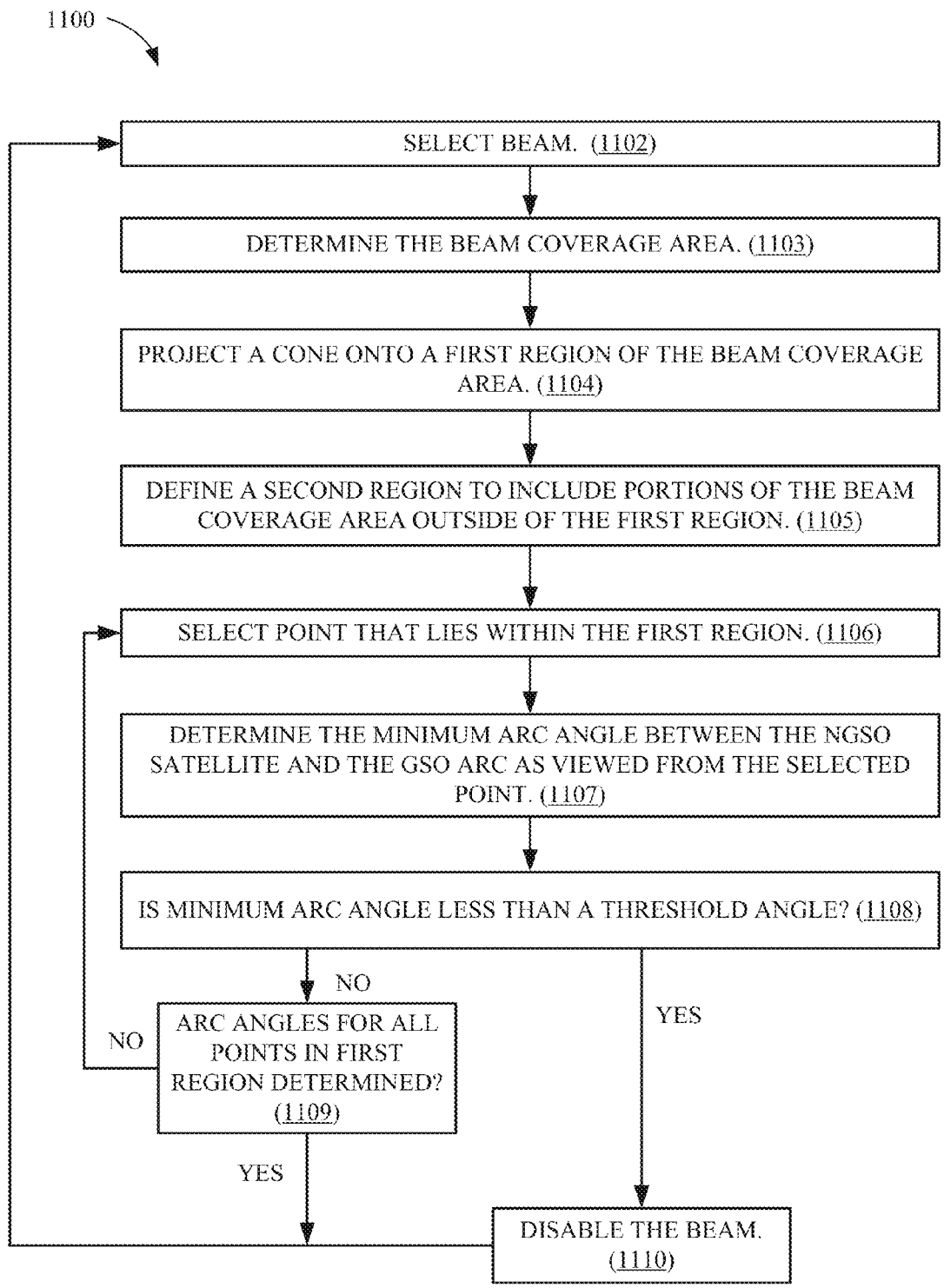
FIG. 11 shows an illustrative flowchart depicting an example operation for selectively disabling a beam of an NGSO satellite.

The controller 850 includes at least a processor 851 and a memory 852. The memory 852 may include a non-transitory computer-readable storage medium (e.g., one or more nonvolatile memory elements, such as EPROM, EEPROM, Flash memory, a hard drive, and so on) that may store the following software modules (SW):

a beam location determination software module 852A to facilitate the determination of the current position of satellite 300, for example, as described for one or more operations of FIG. 11;

a GSO arc locating software module 852B to facilitate the determination of the location of the GSO arc relative to the determined current position of satellite 300, for example, as described for one or more operations of FIG. 11;

a beam enabling and configuration software module 852C to facilitate the enabling or disabling of one or more beams of satellite 300 and/or to adjust a number of parameters (e.g., antenna configurations, beam steering, antenna gain, and/or transmit power levels) of one or more beams of satellite 300, for example, as described for one or more operations of FIG. 11;

a region contour determination software module 852D to facilitate the determination of a PFD contour associated with boundaries between the first region and the second region of the beam coverage area of at least one of satellite 300's beams, for example, as described for one or more operations of FIG. 11; and an arc angle measurement software module 852E to facilitate the determination of arc angles between the GSO arc and satellite 300 from points within the first region of the beam coverage area, for example, as described for one or more operations of FIG. 11.

Each software module includes instructions that, when executed by processor 851, cause controller 850 to perform the corresponding functions. The non-transitory computer-readable medium of memory 852 thus includes instructions for performing all or a portion of the operations of FIG. 11.

Processor 851 may be any suitable one or more processors capable of executing scripts or instructions of one or more software programs stored in controller 850 (e.g., within memory 852). For example, processor 851 may execute the beam location determination software module 852A to facilitate the determination of the current position of satellite 300. Processor 851 may also execute the GSO arc locating software module 852B to facilitate the determination of the location of the GSO arc relative to the determined current position of satellite 300. Processor 851 may also execute the beam enabling and configuration software module 852C to facilitate the enabling or disabling of one or more beams of satellite 300 and/or to adjust a number of parameters (e.g., antenna configurations, beam steering, antenna gain, and transmit power levels) of one or more beams of satellite 300. The beam enabling and configuration software module 852C may also be executed by processor 851 to shape one or more beams of satellite 300, for example, to move, re-orient, and/or resize the one or more beams of satellite 300. For at least one example implementation, phased-array antennas (not shown for simplicity) may be used to shape the one or more beams, for example, in response to one or more of the beams exceeding EPFD limits Processor 851 may also execute the region contour determination software module 852D to facilitate the determination of a PFD contour associated with boundaries between a first region and a second region of the beam coverage area of at least one of satellite 300's beams. Processor 851 may also execute the arc angle measurement software module 852E to facilitate the determination of arc angles between the GSO arc and satellite 300 from points within the first region of the beam coverage area.

According to example implementations, the first region of a beam's coverage area may be determined by projecting a cone from the satellite 300 onto Earth, for example, such that the surface area on Earth covered by the projected cone includes portions of the satellite beam's coverage area having antenna gains within a predetermined decibel limit of the beam's peak antenna gain. According to some aspects, the predetermined decibel limit may be 6 dB (although other suitable predetermined decibel limits may be used). The second region of the beam's coverage area may correspond to a portion of the beam's coverage area that is not within the surface area on Earth covered by the projected cone (e.g., portions of the beam's coverage area that are not within the first region). The second region of the beam's coverage area may be removed from consideration for possible interference with GSO satellites, for example, because the transmission power of the beam's signals within the second region may be sufficiently small to avoid violating the ITU's EPFD limits (e.g., too small to interfere with GSO satellite communications). The beam's transmission power within the first region of the beam's coverage area may be sufficiently close to its peak transmission power level to render interference possible, thereby warranting consideration for possible beam disabling. Thus, as described in more detail below, example implementations may divide the coverage area of a beam transmitted from an NGSO satellite (e.g., from one or more of NGSO satellites 300A-300H of FIG. 6) into first and second regions, for example, such that minimum arc angle determinations may be limited to points on Earth that lie within the first region.

Figure 9A:
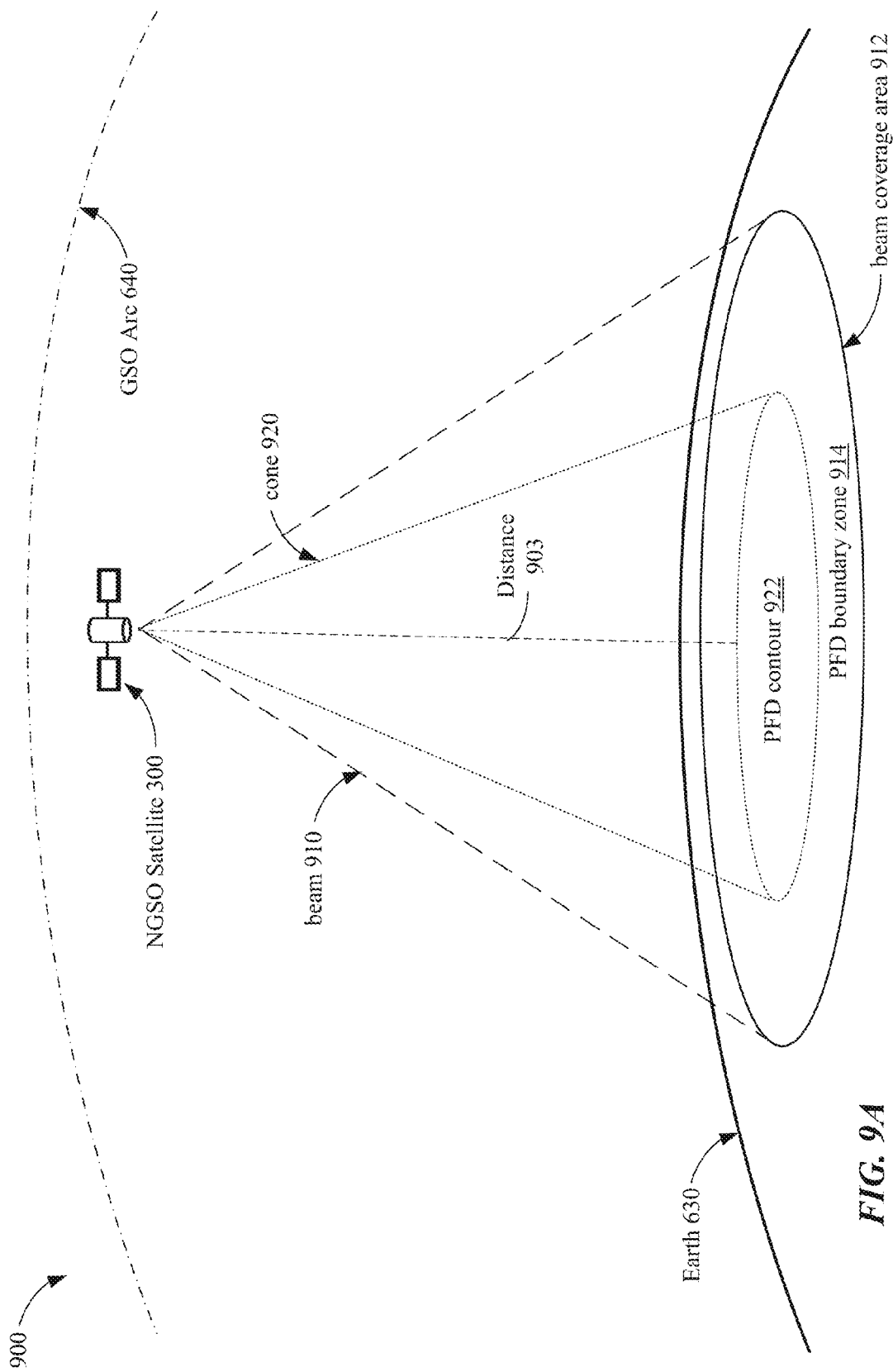
FIG. 9A shows an example depiction of a first region and a second region of a beam coverage area using a cone projected onto the surface of the Earth.

FIG. 9A shows a diagram 900 depicting an example definition of a first region and a second region within a beam coverage area using a cone projected onto the surface of the Earth. As shown in FIG. 9A, NGSO satellite 300 orbits the Earth 630 at a distance or altitude 903. A beam 910 transmitted from satellite 300 may have a coverage area 912 on the Earth's surface. In accordance with example implementations, a cone 920 may be "projected" onto the surface of the Earth 630. It is noted that the cone 920 may not actually be transmitted to or projected onto Earth 630 (e.g., in a physical manner), but rather may represent a simulation of antenna gains of the beam 910 (e.g., as a function of distance from a center of the beam's coverage area on Earth). The surface area on Earth 630 covered by the projected cone 920 may be denoted as a PFD contour 922. The cone 920 may be "sized" such that antenna gains within the PFD contour 922 are within a predetermined decibel limit of the peak antenna gain of beam 910. In some aspects, the first region of beam coverage area 912 may be defined as the PFD contour 922, for example, as depicted in FIG. 9A. The second region of coverage area 912 may be defined as including portions of beam coverage area 912 that lie outside (e.g., not within) the PFD contour 922. For purposes of discussion herein, the second region may be denoted as a PFD boundary zone 914, for example, as depicted in FIG. 9A.

As discussed in more detail below, NGSO satellite 300 may redirect (e.g., using beam steering and/or beam shaping techniques) the beam for which the minimum arc angle is less than the threshold angle such that the resulting beam coverage area associated with the re-directed beam does not exceed the GSO interference criterion. By redirecting the beam, as opposed to disabling the beam, the beam may provide partial coverage for the existing beam coverage area, may provide additional coverage to other coverage areas of the satellite for which the minimum arc angle criterion is not violated, and/or may provide additional coverage to coverage areas of other satellites of the NGSO satellite constellation 610. In addition or as an alternative, one or more other NGSO satellites within the NGSO satellite constellation 610 may redirect one or more of their beams to portions of coverage area 912 of the disabled beam (e.g., thereby providing coverage for at least part of beam coverage area 912 that would otherwise not be covered due to satellite 300 disabling beam 910 or redirecting beam 910 to other coverage areas). For at least some implementations, NGSO satellite 300 and/or other NGSO satellites within the NGSO satellite constellation 610 may use beamforming techniques to alter the size, shape, and/or orientation of the beams.

The redirected beams may also be examined (e.g., using the process described above with respect to the first and second regions 922 and 914, respectively, of the beam coverage area 912) to determine whether any of the redirected beams violate the ITU's EPFD limits.

Note that while the beam coverage area 912, the PFD contour 922, and the PFD boundary zone 914 are depicted as flat and roughly circular in FIG. 9A, in practice these regions may have other shapes (e.g., they may be more elliptical depending on the angle of satellite 300 relative to beam coverage area 912, or they may not be flat, due to elevation changes within beam coverage area 912). More specifically, the illustration shown in FIG. 9A represents the beam coverage area 912 at a particular instant in time (e.g., corresponding to a static position of NGSO satellite 300). As the NGSO satellite 300 revolves around Earth 630 along its orbit, the beam coverage area 912 depicted in FIG. 9A moves along a path that circles the Earth's surface. Thus, although the beam coverage area 912, the PFD contour 922, and the PFD boundary zone 914 are depicted in FIG. 9A as circular or elliptical shapes, in practice the beam coverage area 912, the PFD contour 922, and the PFD boundary zone 914 may be represented by paths that circle Earth's surface, for example, as determined by the NGSO satellite 300's orbit around Earth. As a result, when the orbit of NGSO satellite 300 is considered, the PFD boundary zone 914 may be more accurately represented as two separate boundary zones bordering opposite edges of the PFD contour 922 (e.g., with one boundary zone positioned on one side of PFD contour 922 and the other boundary zone positioned on the other side of PFD contour 922).

Figure 9B:
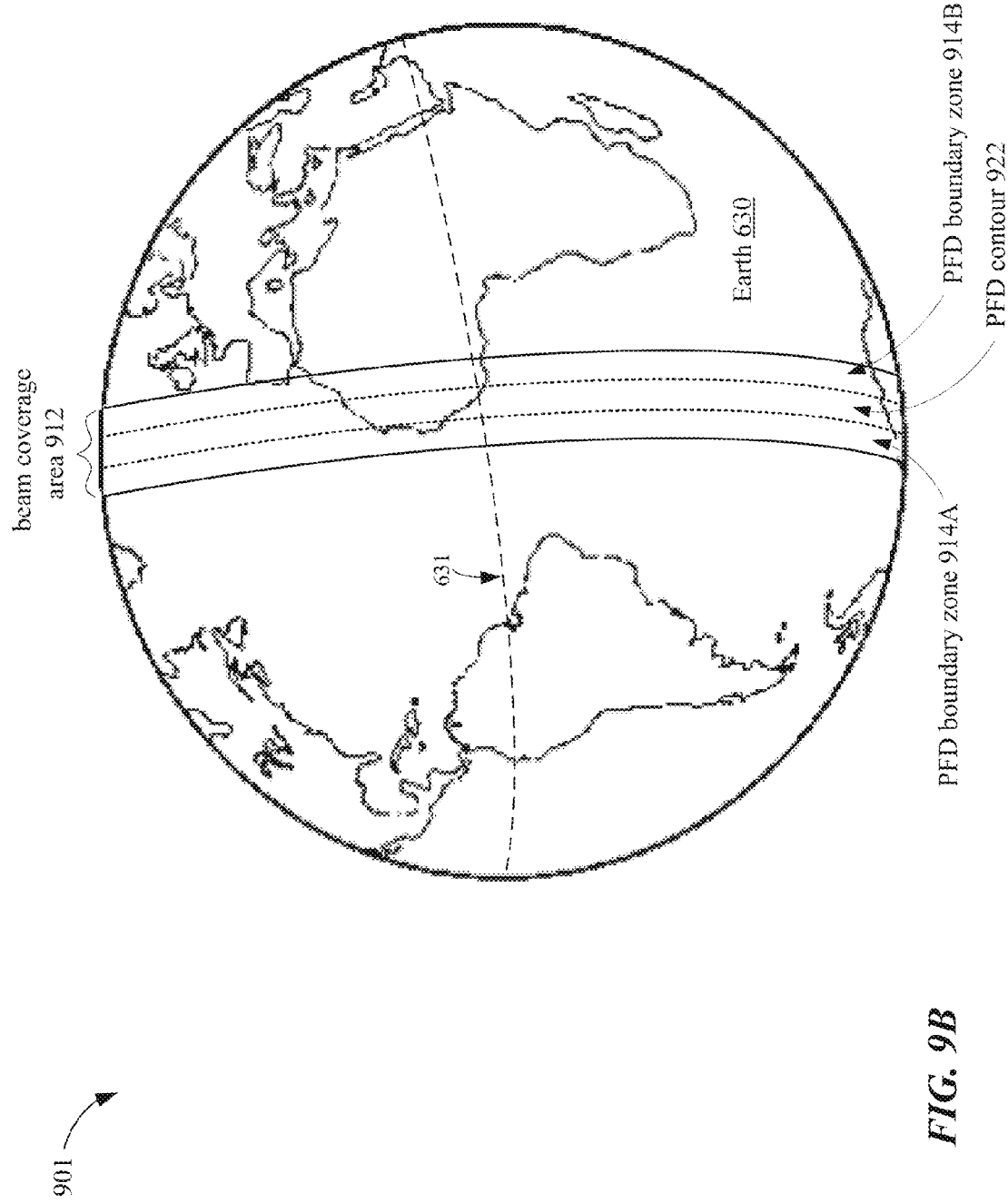
FIG. 9B shows another example depiction of the first region and the second region of FIG. 9A.

For example, FIG. 9B shows a diagram 901 depicting the beam coverage area 912, the PFD contour 922, and the PFD boundary zone 914 of FIG. 9A relative to an example path along the Earth's surface. As depicted in FIG. 9B, the PFD contour 922 occupies a central portion of the beam coverage area 912, while the PFD boundary zones 914A and 914B lie on opposite sides of the PFD contour 922.

For other implementations, the PFD contour 922 may correspond to a region containing all points (on the Earth's surface) that have a PFD value greater than a threshold PFD. The PFD function for the NGSO satellite's beam 910 may be determined based on factors including (but not limited to) the beam's antenna gain pattern and the expected path loss. For some aspects, the threshold PFD may be associated with the EPFD limits established by the ITU for the frequency band used by the NGSO satellite beam. For other aspects, the threshold PFD may be set to a value of approximately −160 dB/m².

More specifically, the NGSO satellite beam 910 may have an associated antenna gain function G(θ), which depends on the angle θ of divergence from the center of the beam pattern. The NGSO satellite beam 910 may also have a transmission power P, and a transmission frequency f. At a point on the ground a distance d from the NGSO satellite, an example PFD including free space path loss may be determined using the following equation (1), where the value of P may be the beam's transmission power normalized to a reference bandwidth:

$$PFD = 10\log_{10}\left(10^{\frac{P}{10}} * \frac{G(\theta)}{4\pi d^2}\right) \quad (1)$$

Thus, the first region of the beam coverage area 912 may be defined as the region for which all points located therein have a PFD value that exceeds a PFD threshold, and the second region of the beam coverage area 912 may be defined as the region for which all points located therein have a PFD value that does not exceed the PFD threshold. When determined using a PFD function such as equation (1), the second region of the beam coverage area 912 may be removed from consideration for possible interference (e.g., with GSO satellite communications), for example, because a PFD value below the threshold PFD may indicate that the power of the satellite beam's signals that are received at points within the second region of the beam coverage area 912 is sufficiently low to make interference with GSO satellite communications unlikely. In contrast, a PFD value greater than the threshold PFD may indicate that the power of the satellite beam's signals that are received at points within the first region of the beam coverage area 912 is sufficiently large that interference with GSO satellite communications may be possible, thereby warranting consideration for possible beam disabling.

Figure 10A:
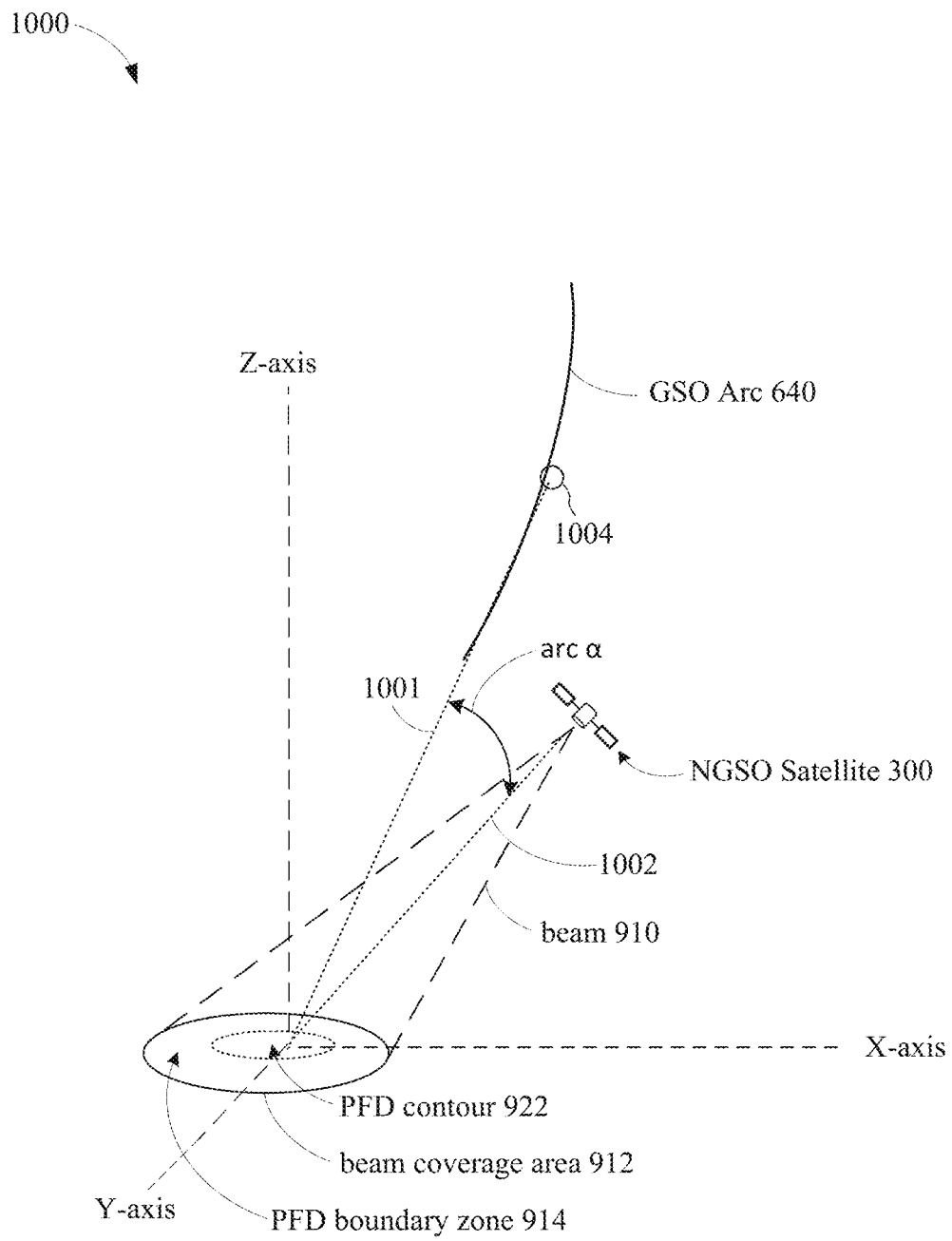
FIG. 10A shows a diagram depicting an example position and/or orientation of an NGSO satellite that may not result in disabling the NGSO satellite's beam.

FIG. 10A shows a diagram 1000 depicting an example position and/or orientation of NGSO satellite 300 that may not result in NGSO satellite 300 disabling beam 910. As shown in FIG. 10A, NGSO satellite 300 transmits a beam 910 having an associated beam coverage area 912 on the Earth's surface (Earth's surface not shown in FIG. 10A for simplicity). The controller 850 may define (e.g., using a cone projection, discussed above with respect to FIG. 9A) a PFD contour 922 within beam coverage area 912 for which all points located therein have a PFD value that exceeds the threshold PFD, as discussed above. For each point within the PFD contour 922 of beam coverage area 912, the controller 850 may determine the minimum arc angle (α) between the GSO arc 640 and the NGSO satellite 300. For the example of FIG. 10A, an example point is located at the origin of the x-axis, y-axis, and z-axis, and an example arc angle (α) is depicted as the angle between a first line 1001 extending from the example point to an example position 1004 along the GSO arc 640 and a second line 1002 extending from the point to the NGSO satellite 300. Although not shown for simplicity, the arc angles between the example point and a plurality of positions along the GSO arc 640 are determined, and the arc angle having the minimum value is determined. The minimum arc angle is then compared with the threshold angle (e.g., to determine whether the PFD value at the example point exceeds the EPFD limits) For the simplified example of FIG. 10A, the depicted minimum arc angle (α) for the example point is greater than the threshold angle, and consequently the beam 910 transmitted from NGSO satellite 300 may not be disabled.

Figure 10B:
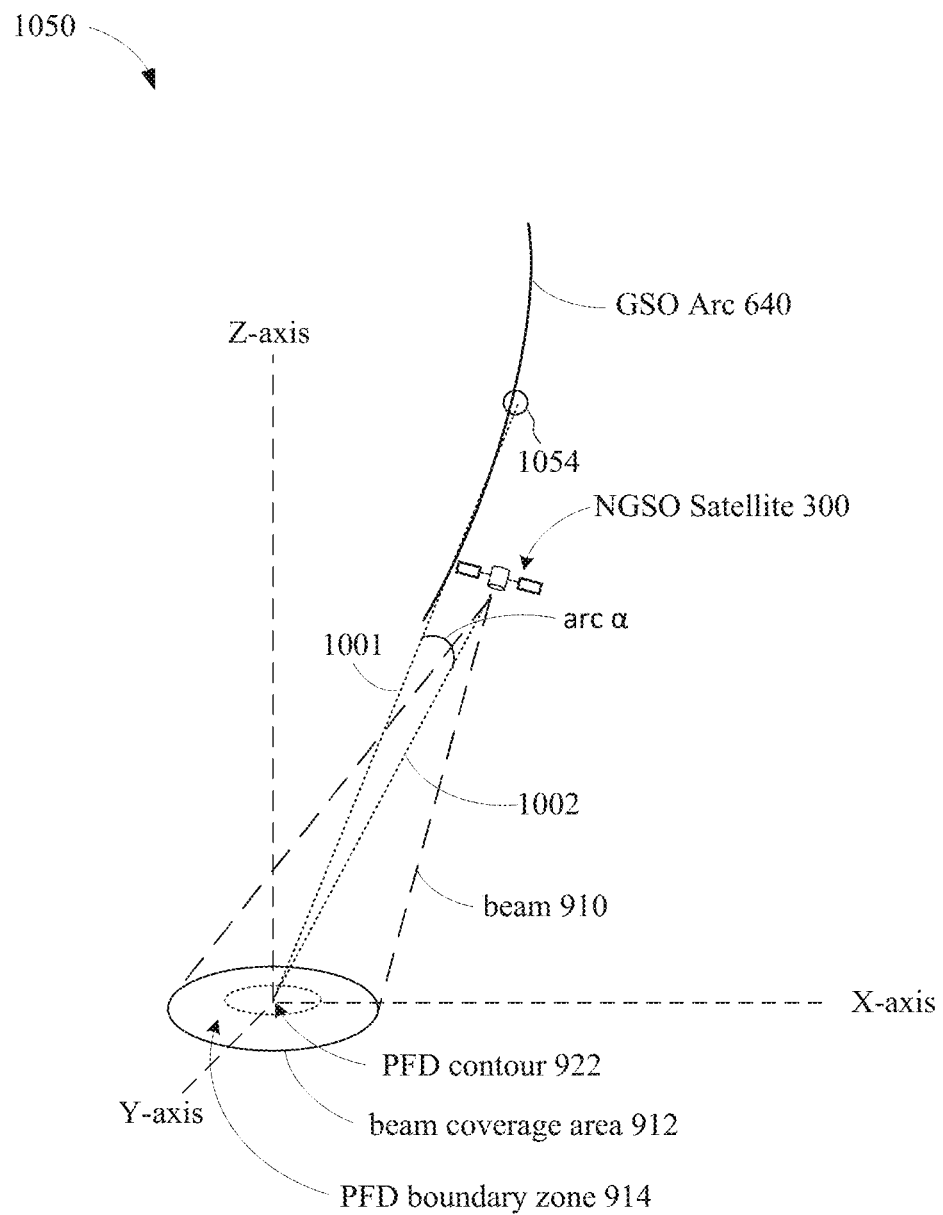
FIG. 10B shows a diagram depicting another example position and/or orientation of an NGSO satellite that may result in disabling the NGSO satellite's beam.

FIG. 10B shows a diagram 1050 depicting another example position and/or orientation of NGSO satellite 300 that may result in NGSO satellite 300 disabling beam 910. As shown in FIG. 10B, NGSO satellite 300 transmits beam 910 having an associated beam coverage area 912 on the Earth's surface (Earth's surface not shown in FIG. 10B for simplicity). The controller 850 may define (e.g., using a cone projection, discussed above with respect to FIG. 8) the PFD contour 922 within which all points have a PFD value that exceeds the threshold PFD, as discussed above. For the example of FIG. 10B, an example point is located at the origin of the x-axis, y-axis, and z-axis, and an example arc angle (a) is depicted as the angle between a first line 1001 extending from the point to an example position 1054 along the GSO arc 640 and a second line 1002 extending from the example point to the NGSO satellite 300. Although not shown for simplicity, the arc angles between the example point and a plurality of positions along the GSO arc 640 are determined, and the arc angle having the minimum value is determined. The minimum arc angle is then compared with the threshold angle (e.g., to determine whether the PFD value at the example point exceeds the EPFD limits). For the simplified example of FIG. 10B, the depicted minimum arc angle (α) is less than the threshold angle, and thus NGSO satellite 300 may consider disabling its beam 910 (e.g., to meet the EPFD limits and/or to avoid interference with GSO satellite communications).

Figure 7C:
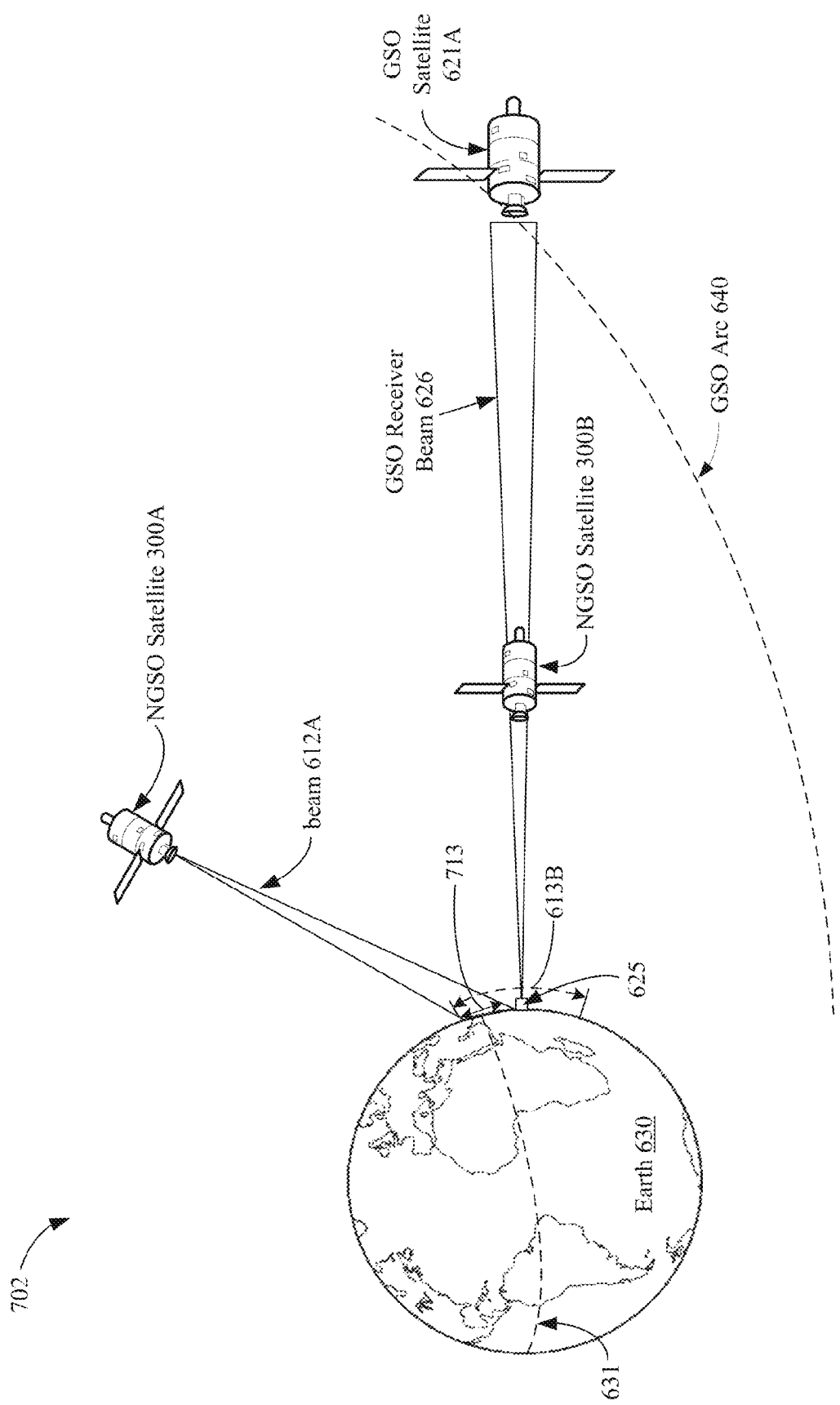
FIG. 7C depicts other example positions of two NGSO satellites with respect to the GSO satellite of FIG. 7A and the Earth.

As mentioned above, when one of the satellites in the NGSO satellite constellation 610 disables beam 910, one or more other satellites in the NGSO satellite constellation 610 may direct (or redirect) one or more of their beams to portions of beam coverage area 912. For example, referring again to FIG. 7A, if the second NGSO satellite 300B disables beam 612B because one or more of the points in its corresponding PFD contour has an arc angle that is less than the threshold angle (e.g., as described above with respect to FIG. 10B), then the first NGSO satellite 300A may direct one or more of its beams (only beam 612A shown in FIG. 7A for simplicity) towards portions of the beam coverage area 613B of the second NGSO satellite 300B. More specifically, referring to the example depiction 702 of FIG. 7C, after the second NGSO satellite 300B disables its beam, the first NGSO satellite 300A may redirect one or more of its beams (only beam 612A shown in FIG. 7C for simplicity) to at least a portion 713 of beam coverage area 613B of the second NGSO satellite 300B. This is in contrast to conventional approaches that may result in no satellite service for any of the beam coverage area that was to be provided by the second NGSO satellite 300B.

The second NGSO satellite 300B may provide information regarding its PFD contour 922 (e.g., the first region), its PFD boundary zone 914 (e.g., the second region), and/or the disabling of its beam 612B to the first NGSO satellite 300A in any suitable manner. For at least one implementation, the second NGSO satellite 300B may provide this information to the first NGSO satellite 300A through one or more gateways (e.g., gateway 200 of FIG. 2). For at least another implementation, the second NGSO satellite 300B may provide this information to the first NGSO satellite 300A using satellite-to-satellite communications.

For some implementations, rather than disabling beam 910 when the arc angle is less than the threshold angle, the NGSO satellite 300 may reduce the beam's transmission power, for example, for periods of time during which the arc angle of any of the points within the PFD contour 922 is less than the threshold angle. Reducing the beam's transmission power decreases the PFD, for example, as may be derived from equation (1) above. Decreasing the PFD associated with beam 910 may reduce the size of the PFD contour 922, which in turn may decrease the likelihood of exceeding EPFD limits and/or causing interference with GSO satellite communications. However, reducing the beam's transmission power may decrease the size of the beam's coverage area 912, which in turn may result in gaps in the NGSO satellite network's coverage area, for example, because some locations may not receive sufficient power for signal reception. Thus, for some implementations, the beam's transmission power may be reduced only to a level sufficient to decrease the size of PFD contour 922 such that the minimum arc angle for one or more points within the beam coverage area 912 are no longer less than the threshold angle. In this manner, the boundary zone(s) 914 may be shifted, for example, so that a greater portion of beam coverage area 912 meets the EPFD limits.

FIG. 11 is an illustrative flow chart depicting an example operation 1100 for selectively disabling a beam of an NGSO satellite (e.g., NGSO satellite 300). The example operation 1100 may be performed by the controller 850 depicted in FIG. 8. However, it is to be understood that operation 1100 may be performed by other suitable satellite controllers and/or by other suitable components of satellite 300. For example, in some aspects, the example operation 1100 may be performed by the EPFD compliance circuit 252, which as discussed above may be implemented within or coupled to a corresponding gateway (e.g., gateway 200 of FIG. 2) and/or implemented within or coupled to the NCC or SCC.

First, a beam is selected to determine whether the beam may potentially cause interference with GSO satellite signals (1102). Then, the beam coverage area of the selected beam is determined (1103). The beam coverage area may be determined, for example, by executing beam location determination software module 852A and/or by executing beam enabling and configuration software module 852C of controller 850.

Then, a cone is projected onto a first region of the beam coverage area (1104). For some implementations, the first region may correspond to an area on the Earth's surface for which the beam's antenna gain is within a threshold value of the beam's maximum antenna gain. For other implementations, the first region may correspond to an area on the Earth's surface for which the power flux density (PFD) is greater than a threshold PFD level. Then, a second region of the beam coverage area may be defined to include portions of the beam coverage area that lie outside of the first region (1105). The first and second regions may be determined, for example, by executing the region contour determination software module 852D of controller 850 (e.g., as described above with respect to FIG. 8).

A point that lies within the first region of the beam coverage area is selected (1106). Then, a minimum arc angle (a) is determined between the NGSO satellite and positions along the GSO arc as viewed from the selected point (1107). Next, the operation 1100 determines whether the minimum arc angle is less than a threshold angle (1108). The minimum arc angle may be determined and compared with the threshold angle, for example, by executing the beam location determination software module 852A, by executing the GSO arc locating software module 852B, and/or by executing the arc angle measurement software module 852E of controller 850.

If the minimum arc angle is less than the threshold angle, as tested at 1108, then the beam is disabled (1110), and another beam is selected (1102). The beam may be disabled, for example, by executing the beam enabling and configuration software module 852C. For some implementations, if the beam is disabled, then one or more beams from one or more other NGSO satellites may be directed to portions of the beam coverage area. These other beams, after being directed to portions of the beam coverage area associated with the disabled beam, may then be selected for operation 1100 to ensure that these other beams do not violate EPFD limits and/or do not interfere with GSO satellite communications. For other implementations, if the minimum arc angle is less than the threshold angle, the power level of the beam may be reduced (rather than disabling the beam). As described above, for at least another implementations, the beam may altered in shape, size, and/or orientation (e.g., using beamforming techniques) to eliminate transmission to forbidden areas while maintaining transmission to permitted areas. For another implementation, the NGSO satellite may redirect (e.g., using beam steering and/or beam shaping techniques) the beam for which the minimum arc angle is less than the threshold angle such that the resulting beam coverage does not exceed the GSO interference criterion (e.g., as described above).

Conversely, if the minimum arc angle is not less than the threshold angle, as tested at 1108, then another point in the first region of the beam coverage area is selected (1106) until the minimum arc angles for all points within the first region of the beam coverage area have been determined and compared with the threshold angle (1109). Thereafter, if the minimum arc angle is greater than the threshold angle for all the points within the first region, then the beam may not be disabled.

Figure 12:
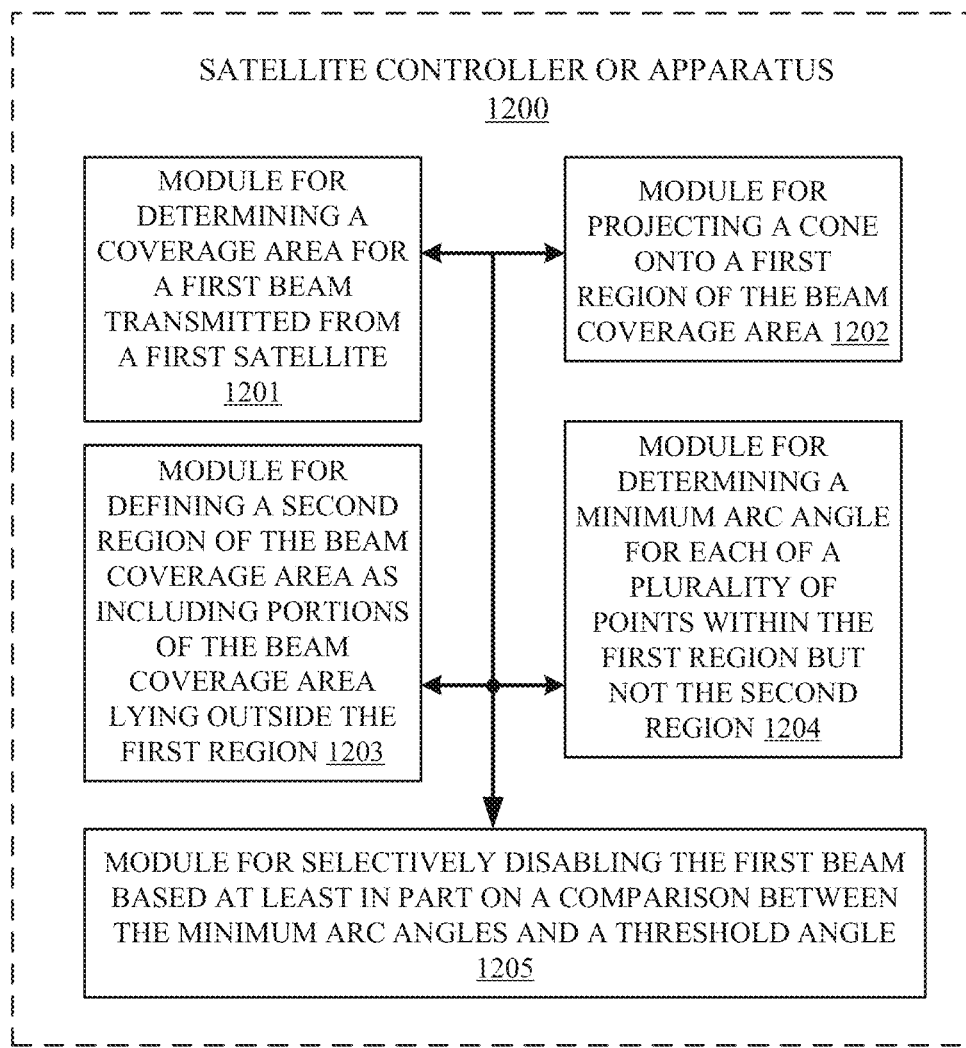
FIG. 12 is another block diagram of several sample aspects of apparatuses configured to support controlling satellite operations as taught herein.

FIG. 12 shows an example satellite controller or apparatus 1200 represented as a series of interrelated functional modules. A module 1201 for determining a coverage area for a first beam transmitted from a first satellite in the NGSO satellite constellation may correspond at least in some aspects to, for example, a processor as discussed herein (e.g., processor 851). A module 1202 for projecting a cone onto a first region of the beam coverage area may correspond at least in some aspects to, for example, a processor as discussed herein (e.g., processor 851). A module 1203 for defining a second region of the beam coverage area as including portions of the beam coverage area lying outside the first region may correspond at least in some aspects to, for example, a processor as discussed herein (e.g., processor 851). A module 1204 for determining a minimum arc angle for each of a plurality of points within the first region but not the second region of the beam coverage area may correspond at least in some aspects to, for example, a processor as discussed herein (e.g., processor 851). A module 1205 for selectively disabling the first beam based at least in part on a comparison between the minimum arc angle and a threshold angle may correspond at least in some aspects to, for example, a processor as discussed herein (e.g., processor 851).

The functionality of the modules of FIG. 12 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 12, as well as other components and functions described herein, may be implemented using any suitable means. Such means also may be implemented, at least in part, using corresponding structure as taught herein. For example, the components described above in conjunction with the "module for" components of FIG. 12 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, one aspect of the disclosure can include a non-transitory computer readable media embodying a method for time and frequency synchronization in non-geosynchronous satellite communication systems. The term "non-transitory" does not exclude any physical storage medium or memory and particularly does not exclude dynamic memory (e.g., conventional random access memory (RAM)) but rather excludes only the interpretation that the medium can be construed as a transitory propagating signal.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A method for operating one or more satellites in a non-geosynchronous orbit (NGSO) satellite constellation, the method comprising: determining a coverage area on Earth for a first beam transmitted from a first satellite in the NGSO satellite constellation; projecting a cone onto a first region of the beam coverage area, the first region of the beam coverage area corresponding to an area on the Earth's surface for which a power flux density (PFD) is greater than a threshold PFD level; defining a second region of the beam coverage area as including portions of the beam coverage area lying outside the first region, the second region of the beam coverage area not interfering with geosynchronous orbit (GSO) satellite communications; and determining a minimum arc angle for each of a plurality of points within the first region but not the second region of the beam coverage area.

2. The method of claim 1, wherein the first region of the beam coverage area corresponds to an area on the Earth's surface for which the first beam's antenna gain is within a threshold value of the first beam's maximum antenna gain, and the second region of the beam coverage area does not interfere with geosynchronous orbit (GSO) satellite communications.

3. The method of claim 1, further comprising:
for a selected one of the plurality of points within the first region,
comparing the determined minimum arc angle for the selected point with a threshold angle; and
selectively disabling the first beam based at least in part on the comparing.

4. The method of claim 3, wherein the selectively disabling comprises:
disabling the first beam based on the determined minimum arc angle being less than the threshold angle; and
selecting another point of the plurality of points based on the determined minimum arc angle being not less than the threshold angle.

5. The method of claim 3, wherein the selectively disabling comprises:
enabling the first beam based on the determined minimum arc angle being greater than or equal to the threshold angle for each of the plurality of points within the first region.

6. The method of claim 1, further comprising:
reducing a power level of the first beam based on the determined minimum arc angle being less than a threshold angle.

7. The method of claim 1, further comprising:
modifying a shape or size of the first beam based on the determined minimum arc angle being less than a threshold angle.

8. The method of claim 1, further comprising:
redirecting the first beam to another coverage area on Earth based on the determined minimum arc angle being less than a threshold angle, the minimum arc angles associated with the other coverage area being greater than or equal to the threshold angle.

9. The method of claim 1, further comprising:
based on the determined minimum arc angle being less than a threshold angle,
disabling the first beam; and
directing a second beam, transmitted from a second satellite in the NGSO satellite constellation, to one or more portions of the coverage area associated with the first beam.

10. An apparatus for operating one or more satellites in a non-geosynchronous orbit (NGSO) satellite constellation, the apparatus comprising: means for determining a coverage area on Earth for a first beam transmitted from a first satellite in the NGSO satellite constellation; means for projecting a cone onto a first region of the beam coverage are, the first region of the beam coverage area corresponding to an area on the Earth's surface for which a power flux density (PFD) is greater than a threshold PFD level; means for defining a second region of the beam coverage area as including portions of the beam coverage area lying outside the first region, the second region of the beam coverage area not interfering with geosynchronous orbit (GSO) satellite communications; and means for determining a minimum arc angle for each of a plurality of points within the first region but not the second region of the beam coverage area.

11. The apparatus of claim 10, wherein the first region of the beam coverage area corresponds to an area on the Earth's surface for which the first beam's antenna gain is within a threshold value of the first beam's maximum antenna gain.

12. The apparatus of claim 10, further comprising:
for a selected one of the plurality of points within the first region,
means for comparing the determined minimum arc angle for the selected point with a threshold angle; and
means for selectively disabling the first beam based at least in part on the comparing.

13. The apparatus of claim 12, wherein the means for selectively disabling is to:
disable the first beam based on the determined minimum arc angle being less than the threshold angle; and
select another point of the plurality of points based on the determined minimum arc angle being not less than the threshold angle.

14. The apparatus of claim 12, wherein the means for selectively disabling is to enable the first beam based on the determined minimum arc angle being greater than or equal to the threshold angle for each of the plurality of points within the first region.

15. The apparatus of claim 10, further comprising:
means for redirecting the first beam to another coverage area on Earth based on the determined minimum arc angle being less than a threshold angle, the minimum arc angles associated with the other coverage area being greater than or equal to the threshold angle.

16. The apparatus of claim 10, further comprising:
based on the determined minimum arc angle being less than a threshold angle,
means for disabling the first beam; and
means for directing a second beam, transmitted from a second satellite in the NGSO satellite constellation, to one or more portions of the coverage area associated with the first beam.

17. An apparatus for operating one or more satellites in a non-geosynchronous orbit (NGSO) satellite constellation, the apparatus comprising: one or more processors; and a memory storing instructions that, when executed by the one or more processors, cause the apparatus to: determine a coverage area on Earth for a first beam transmitted from a first satellite in the NGSO satellite constellation; project a cone onto a first region of the beam coverage area, the first region of the beam coverage area corresponding to an area on the Earth's surface for which a power flux density (PFD) is greater than a threshold PFD level; define a second region of the beam coverage area as including portions of the beam coverage area lying outside the first region, the second region of the beam coverage area not interfering with geosynchronous orbit (GSO) satellite communications; and determine a minimum arc angle for each of a plurality of points within the first region but not the second region of the beam coverage area.

18. The apparatus of claim 17, wherein the first region of the beam coverage area corresponds to an area on the Earth's surface for which the first beam's antenna gain is within a threshold value of the first beam's maximum antenna gain.

19. The apparatus of claim 17, wherein execution of the instructions causes the apparatus to further:
for a selected one of the plurality of points within the first region, compare the determined minimum arc angle for the selected point with a threshold angle; and selectively disable the first beam based at least in part on the comparing.

20. The apparatus of claim 19, wherein execution of the instructions to selectively disable the first beam causes the apparatus to:

disable the first beam based on the determined minimum arc angle being less than the threshold angle; and select another point of the plurality of points based on the determined minimum arc angle being not less than the threshold angle.

21. The apparatus of claim 19, wherein execution of the instructions to selectively disable the first beam causes the apparatus to:

enable the first beam based on the determined minimum arc angle being greater than or equal to the threshold angle for each of the plurality of points within the first region.

22. The apparatus of claim 17, wherein execution of the instructions causes the apparatus to further:

redirect the first beam to another coverage area on Earth based on the determined minimum arc angle being less than a threshold angle, the minimum arc angles associated with the other coverage area being greater than or equal to the threshold angle.

23. The apparatus of claim 17, wherein execution of the instructions causes the apparatus to further:

based on the determined minimum arc angle being less than a threshold angle,
disable the first beam; and
direct a second beam, transmitted from a second satellite in the NGSO satellite constellation, to one or more portions of the coverage area associated with the first beam.

24. A non-transitory computer-readable medium storing instructions that, when executed by one or more processors of an apparatus, cause the apparatus to perform operations comprising: determining a coverage area on Earth for a first beam transmitted from a first satellite in a non-geosynchronous orbit (NGSO) satellite constellation; projecting a cone onto a first region of the beam coverage area, the first region of the beam coverage area corresponding to an area on the Earth's surface for which a power flux density (PFD) is greater than a threshold PFD level; defining a second region of the beam coverage area as including portions of the beam coverage area lying outside the first region, the second region of the beam coverage area not interfering with geosynchronous orbit (GSO) satellite communications; and determining a minimum arc angle for each of a plurality of points within the first region but not the second region of the beam coverage area.

25. The non-transitory computer-readable medium of claim 24, wherein the first region of the beam coverage area corresponds to an area on the Earth's surface for which the first beam's antenna gain is within a threshold value of the first beam's maximum antenna gain.

26. The non-transitory computer-readable medium of claim 24, wherein execution of the instructions causes the apparatus to perform operations further comprising:

for a selected one of the plurality of points within the first region,
comparing the determined minimum arc angle for the selected point with a threshold angle; and
selectively disabling the first beam based at least in part on the comparing.

27. The non-transitory computer-readable medium of claim 26, wherein execution of the instructions for selectively disabling the first beam causes the apparatus to perform operations further comprising:

disabling the first beam based on the determined minimum arc angle being less than the threshold angle; and
selecting another point of the plurality of points based on the determined minimum arc angle being not less than the threshold angle.

28. The non-transitory computer-readable medium of claim 24, wherein execution of the instructions causes the apparatus to perform operations further comprising:

redirecting the first beam to another coverage area on Earth based on the determined minimum arc angle being less than a threshold angle, the minimum arc angles associated with the other coverage area being greater than or equal to the threshold angle.

29. The non-transitory computer-readable medium of claim 24, wherein execution of the instructions causes the apparatus to perform operations further comprising:

based on the determined minimum arc angle being less than a threshold angle,
disabling the first beam; and
directing a second beam, transmitted from a second satellite in the NGSO satellite constellation, to one or more portions of the coverage area associated with the first beam.

* * * * *